(12) United States Patent
Suzuki

(10) Patent No.: US 6,364,764 B1
(45) Date of Patent: Apr. 2, 2002

(54) GAME SYSTEM, AND OPERATION GUIDING SYSTEM AND COMPUTER READABLE STORAGE MEDIUM SUITABLE FOR THE SAME

(75) Inventor: Gen Suzuki, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/713,897

(22) Filed: Nov. 16, 2000

(30) Foreign Application Priority Data

Nov. 25, 1999 (JP) .......................................... 11-334069

(51) Int. Cl.⁷ ................................................ A63K 9/30
(52) U.S. Cl. ........................... 463/7; 273/461; 273/139; 273/140
(58) Field of Search ....................... 463/43, 7; 273/140, 273/139, 461

(56) References Cited

U.S. PATENT DOCUMENTS 5,713,792 A * 2/1998 Ohzono et al. ................. 463/7
5,730,655 A * 3/1998 Meredith ...................... 463/37

FOREIGN PATENT DOCUMENTS

| JP | 11226261 A | * | 2/1998 |
| JP | 2000093650 A | * | 9/1998 |

OTHER PUBLICATIONS

Trophy Rivers v.10 (Sierra May 8,1998, p. 1, source:ZDnet).*
Trophy Bass 2 (Sierra Dec. 13, 1996, p. 1, source:ZDnet).*
Trophy Bass v1.0 (Sierra Aug. 7, 1996), p. 1, source: ZDnet.*
Reel Fishing Review, by Johs Smith, May 12, 1998.*

* cited by examiner

*Primary Examiner*—Jessica J. Harrison
*Assistant Examiner*—Yveste G Cherubin
(74) *Attorney, Agent, or Firm*—Jordan and Hamburg LLP

(57) ABSTRACT

A game system comprises: a display device 3; an input device for outputting a signal according to a player's operation; and a control device 10 for advancing a fishing game utilizing a contrivance such as a lure in a virtual fishing spot with reference to an output of the input device 4, and displaying an image according to the progress on a screen of the display device 3. In this game system, a lure operation is guided to the player through the screen of the display device 3 by means of the control device 10. The guided operation is compared with the lure operation caused by the player via the input device 4, and the player's lure operation is evaluated. This evaluation is notified to the player, and the progress in fishing game is changed according to the evaluation. In this manner, a game system capable of continuously stimulating the player by eliminating a monotonous aspect in work for catching a fish is provided.

30 Claims, 15 Drawing Sheets

GAME SYSTEM, AND OPERATION GUIDING SYSTEM AND COMPUTER READABLE STORAGE MEDIUM SUITABLE FOR THE SAME

BACKGROUND OF THE INVENTION

1. Technical Field of the Invention

The present invention relates to a game system using a computer, and an operation guiding system and a storage medium suitable for the same.

2. Description of the Prior Art

As a game of such type, there is known a fishing game in which a fishing spot is displayed on a screen of a display device, and a fisherman, a position and activity of a fishing rod and the like in the screen are changed according to a player's operation in response to an input device, thereby causing fishing to be virtually experienced. With respect to lure fishing, there exists a high strategy regarding the selection and combination of point, lure and approach, and thus, there are a plenty of games of such type. In particular, in a game which takes priority in reality, there is well reproduced the feeling of actual fishing in which a variety of actions is produced at a lure according to the player's operation, these actions attract a fish's interest, thereby causing the fish to bite at the lure, which is satisfied with the player who is interested in fishing.

However, there has not existed a game which guides the lure's actions, and which presents the player with to what extent an effect is attained by such actions. The player provides the lure with various actions gropingly. Even if the player catches a fish successfully, the player cannot identify whether the result is caused by a luck or is caused by an effect on adequate lure actions. Therefore, the play contents are likely to depend on a monotonous repetition of works such as lure casting and retrieval, the player does not feel an intellectual aspect in the play, and may lose his or her interest in the game at an earlier stage.

SUMMARY OF THE INVENTION

It is an object of the present invention to provide a game system which continuously stimulates a player by eliminating the monotonousness from works requested in a process for improving a predetermined result, thereby increasing the player's interest, and an operation guiding system and a computer readable storage medium preferably used for such game system.

A game system of the present invention comprises an image display device, an input device for outputting a signal according to the player's operation, and a control device for advancing a fishing game utilizing a contrivance in a virtual fishing spot with reference to the output of the input device, and displaying an image according to the progress on the screen of the display device. In order to solve the aforementioned problem, the control device comprises: guide device for guiding a contrivance operation to the player through the screen of the display device; evaluation device for comparing the operation guided by the guide device with the contrivance operation caused by the player via the input device, thereby evaluating the player's contrivance operation; evaluation notifying device for notifying the evaluation caused by the evaluation device to the player; and evaluation reflecting device for changing the progress of the fishing game according to the evaluation caused by the evaluation device.

According to the game system of the present invention, a contrivance operation is guided to the player, and thus, the player can properly operate the contrivance by referring to that guidance. The guided operation and an actual operation are compared with each other and are evaluated, and the evaluation result is notified to the player, and the progress of the fishing game is changed according to the evaluation result. Thus, the player concentrates his or her consciousness on faithfully operating a contrivance in response to the guidance on the screen in order to obtain high score. In this manner, the monotonousness concerning a contrivance retrieving work are eliminated, the player is continuously stimulated, and the player's interest in the game is increased.

In the game system of the present invention, the guide device may present the player with information concerning a direction of operating a contrivance, and may present the player with information concerning a timing of operating the contrivance.

In a preferred embodiment of the game system according to the present invention, the guide device displays a first image corresponding to the contrivance and a second image indicating a position through which the contrivance should pass on the screen of the display device. When the contrivance is retrieved at the virtual fishing spot, the first image is relatively moved in the contrivance retrieving direction relevant to the second image, and the first and second images are relatively moved in a direction orthogonal to the contrivance retrieving direction according to a predetermined course change operation relevant to the input device, whereby the contrivance operation may be guided.

By doing this, while there is expressed an appearance in which the contrivance is retrieved by relative movement relevant to the retrieving direction, there can be expressed an appearance in which the contrivance is moved horizontally on a water surface through relative movement in a direction orthogonal to the retrieving direction, and is moved vertically underwater. Then, a plurality of second images are dispersed properly, whereby the player is presented with a plurality of preferable passing positions of the contrivance on a water surface or underwater, and a course change operation is requested to the player so that the first image passes through these positions, whereby a preferable contrivance operation (action) can be clearly guided to the player. The difficulties in the contrivance operation can be changed according to the allocation state of the second images.

Further, in the guide device when a predetermined course change operation is made for the input device, the first image may be relatively displaced in a direction orthogonal to the retrieving direction relevant to the second image. When the predetermined course change operation is not made, the first image may be held at a predetermined position relevant to the second image with respect to the orthogonal direction. In this case, if no such course change operation is made, the contrivance does not move in a direction orthogonal to the retrieving direction. Thus, an appearance of the contrivance on the water surface or underwater viewed from the uuperside can be preferably expressed. Therefore, it is convenient to guide a crosswise operation of the contrivance on water level.

On the other hand, in the guide device, when a predetermined course change operation is made for the input device, the first and the second images may be relatively displaced in one direction orthogonal to the retrieving direction. When the predetermined course change operation is not made, the first and the second images may be relatively displaced in the other direction of the orthogonal direction. In this case, when no such course change operation is made, a contrivance moves to the other side in the orthogonal direction relevant to the retrieving direction. Thus, an appearance in which the contrivance floats and sinks according to the player's operation can be preferably expressed on a cross section at which underwater is cut out in the vertical direction. Therefore, it is convenient to guide a contrivance operation mainly in the vertical direction underwater.

In addition, mode selecting device for selecting a first mode or a second mode according to a predetermined condition is provide. In the case where the first mode is selected, in the guide device, when a predetermined course change operation is made for the input device, the first image is relevantly displaced in a direction orthogonal to the retrieving direction relevant to the second image. When the predetermined course change operation is made, the first image is held at a predetermined position relevant to the second image with respect to the orthogonal direction. In the case where the second mode is selected, in the guide device, when a predetermined course change operation is made for the input device, the first and the second images may be relatively displaced in one direction orthogonal to the retrieving direction. When the predetermined course change operation is made, the first image and the second image may be relatively displaced in the other direction of the orthogonal direction. Further, in the mode selecting device, it is desirable to select the first or second mode according to the type of contrivance.

By doing this, the first mode is selected for a contrivance to be mainly operated in the crosswise direction and the second mode is selected for a contrivance to be mainly operated in the vertical direction, thereby making it possible to achieve proper operation guidance in consideration of characteristics for each contrivance.

In the game system of the present invention, a plurality of marks indicating a position through which the contrivance should pass may be displayed as the second image to be dispersed in a plane defined by the retrieving direction and the orthogonal direction. In this case, while the first image relatively moves in the retrieving direction relevant to the second image, these marks are sent one after another from the front side of the first image. The player has to continuously make a course change operation by picking up these marks, and the player's interest in the contrivance operation is stimulated more strongly.

Locus curves that continuously connect positions through which the contrivance should pass through may be displayed as the second image. In this case while the first image relatively moves in the retrieving direction relevant to the second image, the player has to continuously make a course change operation along the locus curve, whereby the player's interest in a contrivance operation is stimulated more strongly.

In the guide device, relative movement in the retrieving direction may be achieved by scrolling the second image. By doing this, even if a display region allocated to the guide device is narrow, a relative movement quantity in the retrieving direction between the second image and the first image until the contrivance is retrieved from casting can be set to be long without being limited to dimensions of the display region. In this manner, continuity or successiveness regarding a contrivance operation guidance can be well ensured, and the pleasure of a contrivance operation can be well performed.

Further, in the guide device, relative movement of the orthogonal direction may be achieved by moving the first image. By doing this, an image corresponding to the contrivance moves directly according to the player's operation. Thus, crosswise or vertical movement relevant to the contrivance retrieving direction can be intuitively grasped by the player.

In the game system of the present invention, a speed of relative movement between the first and second images with respect to the retrieving direction may be changed. In this case, a difference in speeds at which the contrivance is retrieved can be expressed by increasing and decreasing a relative speed. In addition, the higher the speed becomes, the more difficult the course change operation becomes. Thus, the difficulty can be adjusted according to speed. Further the speed of the relative movement may be changed according to a speed change operation for the input device. By doing this, an appearance in which a contrivance retrieving speed changes according to the player's operation can be expressed, and the player can adjust the difficulty in a contrivance operation to some extent. For example, a retrieving speed is intentionally reduced at a site at which the second image is closely allocated, whereby the difficulty in the course change operation can be reduced. The difficulty can be intentionally increased by increasing the retrieving speed.

In the game system of the present invention, the evaluation device judges whether or not the first image passes on the second image, whereby the contrivance operation may be evaluated in consideration of the judgment result. By doing this, the game progress can be changed according to when such course change operation is properly made, whereby the first image passes preciously on the second image or when such operation is not made.

In addition, the evaluation device judges whether or not a predetermined appeal operation is made for the input device in accordance with a timing at which the first image passes through the second image, whereby the contrivance operation may be evaluated in consideration of the judgment result. By doing this, an element in which a course change operation is proper or not and an element in which proper operation is made according to a timing are included in an evaluation target, and a variety of operations based on real fishing can be requested to the player. For example, an operation in which a fishing rod is swung, thereby momentously move the contrivance vertically can be requested to the player.

In the game system of the present invention, in the evaluation device, as the operation guided by the guide device coincides with the contrivance operation made by the player via the input device, the appealing degree of the contrivance may be increased. In the evaluation reflecting device, the player's advantage and disadvantage in the fishing game can be changed based on the appealing degree. By doing this, as the faithfulness of the player's operation in response to an operation guidance is higher, the appealing degree is increased, and the game is advanced to an advantageous situation. Therefore, the player has stronger interest in the contrivance operation, and the player is stimulated more significantly.

In the evaluation reflecting device, when the appealing degree is equal to or more than a predetermined value, an advantageous situation in the fishing game may be produced for the player. Alternatively, in the evaluation reflecting device, when the appealing degree is equal to or more than a predetermined value, fish hooking may be permitted as an advantageous situation in the fishing game. When the appealing degree is less than a predetermined value, the fish hooking may be forbidden as a disadvantageous situation in the fishing game. By doing this, an advantageous situation is not produced for the player in a state in which the appealing degree is less than the predetermined value. Alternatively, when no fish is caught, the player's interest is always attracted to the contrivance operation, and an effect caused by providing operation guide device is achieved maximally.

The other game system of the present invention comprises: an image display device; an input device for outputting a signal according to the player's operation; and a control device for advancing a fishing game utilizing a contrivance in a virtual fishing spot with reference to an output of the input device, thereby displaying an image according to the progress on a screen of the display device. In order to solve the aforementioned problems, the control device comprises: display setting device for displaying on a screen of the display device a first image corresponding to the contrivance and second images indicating a position through which the contrivance should pass; relative movement control device for relatively moving the first image in a predetermined retrieving direction relevant to the second image, and relatively moving the first and second images in a direction orthogonal to the retrieving direction according to a predetermined course change operation for the input device; evaluation device for judging whether or not the first image passes on the second image, thereby evaluating the contrivance operation in consideration of the judgment result; evaluation notifying device for notifying the evaluation caused by the evaluation device to the player; and evaluation reflecting device for changing the progress of the fishing game according to the evaluation caused by the evaluation device.

According to this game system, evaluation changes according to whether or not the first image passes on the second image. Thus, the player concentrates his or her consciousness on work of operating a contrivance when the second image is defined as a reference. In this manner, the monotonousness regarding a contrivance retrieving work is eliminated, the player is continuously simulated, and the player's interest in the game is enhanced. While there is expressed an appearance in which the contrivance is retrieved by a relative movement between the first image and the second image regarding the retrieving direction, there can be expressed an appearance in which the contrivance moves horizontally on a water level or moved vertically underwater due to a relative movement between these images in a direction orthogonal to the retrieving direction. A plurality of second images are properly dispersed, whereby a plurality of preferable passing positions of the contrivance on water level or underwater are presented for the player. A course change operation is requested to the player so that the first image passes through these positions, whereby a preferable contrivance operation (action) can be clearly guided to the player. The difficulty in the contrivance operation can be changed according to an allocation situation of the second image. The evaluation device judges whether or not a predetermined appeal operation is made for the input device according to a timing with which the first image passes on the second image, whereby the contrivance operation may be evaluated in consideration of the judgment result.

A still another game system of the present invention comprises: an image display device; an input device for outputting a signal according to the player's operation; and a control device for advancing a game in accordance with predetermined procedures with reference to an output of the input device and displaying an image according to the progress on a screen of the display device. In order to solve the aforementioned problems, the control device comprises: display setting device for displaying on the screen of the display device a first image corresponding to a game element set as the player's operation target and a second image which functions as a reference for operating the game element; image control device for scrolling the second image in a predetermined first direction, a moving the first image in a second direction orthogonal to the first direction according to a predetermined operation for the input device; evaluation device for judging whether or not the first image passes on the second image, thereby evaluating the player's operation in consideration of the judgment result; evaluation notifying device for notifying the evaluation caused by the evaluation device to the player; and evaluation reflecting device for changing the progress of the game according to the evaluation caused by the evaluation device.

In this game system as well, as in the aforementioned other game system, the player concentrates his or her consciousness on work of operating a game element when the second image is defined as a reference. In this manner, the monotonousness regarding work of operating the game element is eliminated, the player is continuously stimulated, and the player's interest in the game is enhanced. A contrivance in a fishing game should be preferably employed as a game element. In the other type of game as well, as long as anything is set as the player's operation target, it can be assumed as a game element. The evaluation device judges whether or not a predetermined coordination operation is made for the input device in accordance with a timing at which the first image passes on the second image, whereby the operation may be evaluated in consideration of the judgment result.

In addition, an operation guiding system of the present invention is directed to an operation guiding system for guiding to the player through a display device of a game device a preferable operation concerning a game element set as the player's operation target. This operation guiding system comprises: display setting device for displaying on a screen of the display device a first image corresponding to the game element and a second image which functions as a reference for operating the game element; relative movement control device for relatively moving the first image in a first direction relevant to the second image, and relatively moving the first and second images in a second direction orthogonal to the first direction according to a predetermined course change operation for the input device of the game device, wherein the display setting device displays a plurality of marks indicating a position through which the game element should pass as the second image to be dispersed in a plane defined by the first and the second directions.

Such operation guiding system is applied to a fishing game, and a contrivance used in the fishing game is set as a game element that is an operation target, thereby making it possible to realize guide device of the game system according to the fishing game of the present invention. In the relative movement control device, relative movement in the first direction may be achieved by scrolling the second image. In the relative movement control guide device, relative movement of the second direction may be achieved by moving the first image in the second direction.

A storage medium of the present invention is directed to a computer readable storage medium having recorded therein a program for advancing a fishing game utilizing a contrivance in a virtual fishing spot with reference to an output from an input device of a game device, and displaying an image according to the progress on a screen of a display device of the game device, the storage medium being characterized in that the program causes a computer provided in the game device to function as guide device for guiding a contrivance operation to the player through a screen of the display device; evaluation device for evaluating the contrivance operation of the player by comparing the operation guided by the guide device with the contrivance operation by the player via the input device; evaluation notifying device for notifying the evaluation caused by the evaluation device to the player; and evaluation reflecting device for changing the progress of the fishing game according to the evaluation caused by the evaluation device, respectively.

Another storage medium of the present invention is directed to a computer readable storage medium having recorded therein a program for advancing a fishing game utilizing a contrivance in a virtual fishing spot with reference to an output from an input device of a game device, and displaying an image according to the progress on a screen of the display device of the game device, the storage medium being characterized in that the program causes a computer provided in the game device to function as display setting device for displaying on a screen of the display device a first image corresponding to the contrivance and second images indicating a position through which the contrivance should pass; relative movement control device for relatively moving the first image in a predetermined retrieving direction relevant to the second image, and relatively moving the first and the second images in a direction orthogonal to the retrieving direction according to a predetermined course change operation for the input device; evaluation device for judging whether or not the first image passes on the second image, thereby evaluating the contrivance operation in consideration of the judgment result; evaluation notifying device for notifying the evaluation caused by the evaluation device to the player; and evaluation reflecting device for changing the progress of the fishing game according to the evaluation caused by the evaluation device, respectively.

Still another storage medium of the present invention is directed to a computer readable storage medium having recorded therein a program for guiding a preferable operation concerning a game element set as the player's operation target to the player through a display device of a game device, the storage medium being characterized in that the program causes a computer provided in the game device to function as display setting device for displaying on a screen of the display device a first image corresponding to the game element and second images functioning as a reference for operating the game element; image control device for scrolling the second image in a predetermined first direction, and moving the first image in a second direction orthogonal to the first direction according to a predetermined operation for the input device; evaluation device for judging whether or not the first image passes on the second image, thereby evaluating the player's operation in consideration of the judgment result; evaluation notifying device for notifying the evaluation caused by the evaluation device to the player; and evaluation reflecting device for changing the progress of the game according to the evaluation caused by the evaluation device, respectively.

According to these storage media, the programs are read and executed by a computer, whereby the computer can function as a control device in the game system of the present invention.

In addition, another storage medium of the present invention is directed to a computer readable storage medium having recorded therein a program for guiding a preferable operation concerning a game element set as the player's operation target through a display device of a game device, the storage medium being characterized in that the program causes a computer provided in the game device to function as display setting device for displaying on a screen of the display device a first image corresponding to the game element and second images functioning as a reference for operating the game element; and relative movement control device for relatively moving the first image in a first direction relevant to the second image and relatively moving the first and second images in a second direction orthogonal to the first direction according to a predetermined change operation for the input device of the game device, respectively, the storage medium being characterized in that the display setting device displays a plurality of marks indicating a position at which the game element should pass as the second image to be dispersed in a plane defined by the first and second directions.

According to this storage medium, the program is read and executed by a computer, whereby the computer can function as an operation guiding system of the present invention.

The "contrivance" in the present invention includes a variety of elements to be operated in order to catch a fish in actual fishing such as lure, flay, pseudo food and the like. The storage medium includes a variety of storage device such as a magnetic storage medium, an optical storage medium, a magneto-optical storage medium, a semiconductor storage element and the like.

PREFERRED EMBODIMENTS OF THE INVENTION

Figure 1:
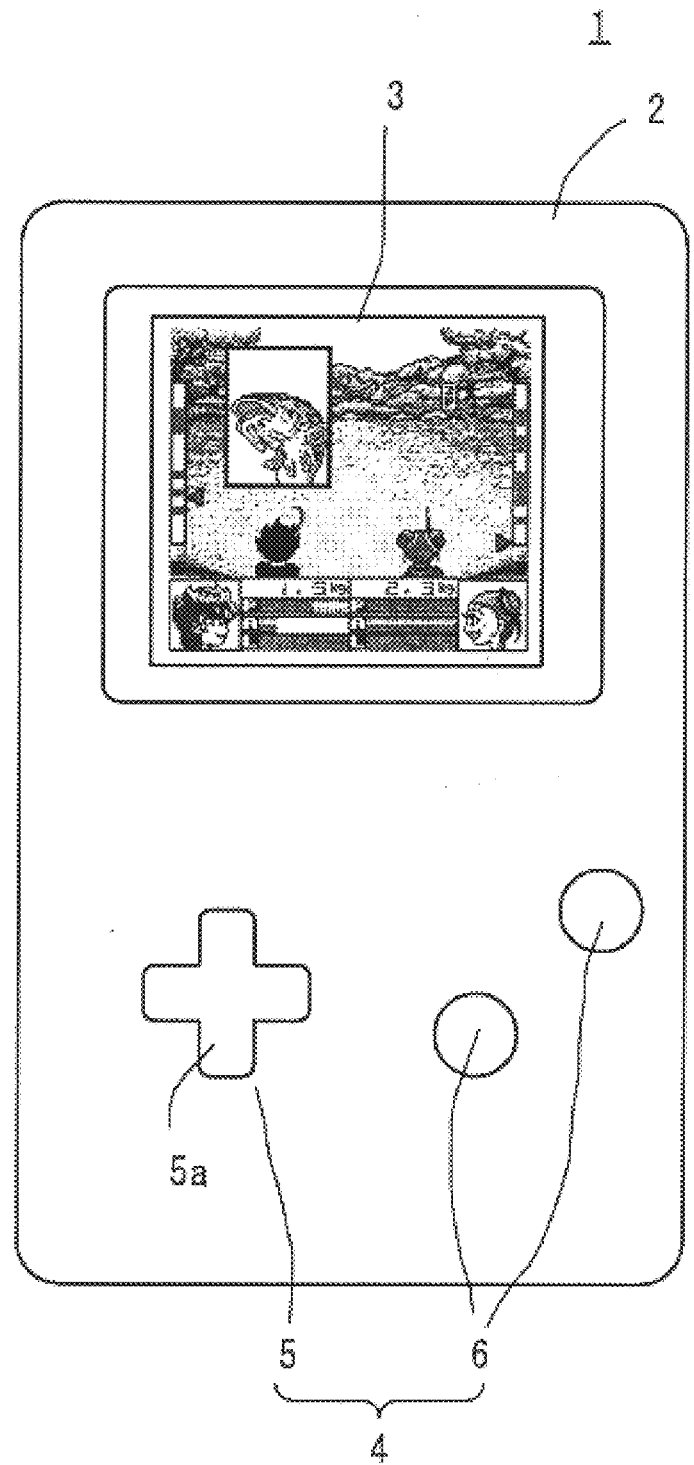
FIG. 1 is a diagram showing a portable game device according to one embodiment of the present invention.

FIG. 1 shows a configuration of a portable game device according to an embodiment of the present invention. A portable game device 1 has a main body 2, a liquid crystal monitor 3 which is a display device mounted on the main body 2, and an input device 4. The input device 4 comprises a direction indicating switch 5 and a plurality of push button switches 6. The direction indicating switch 5 has a cross shaped operating member 5a, for example, and outputs a signal corresponding to vertical and crosswise operations (push operation at the vertical and crosswise ends) of the operating member 5a. A configuration of such input device 4 is well know, and various modifications can occur. For example, respective one push button switch in each of the vertical and crosswise directions may be disposed instead of the operating member 5a.

Figure 2:
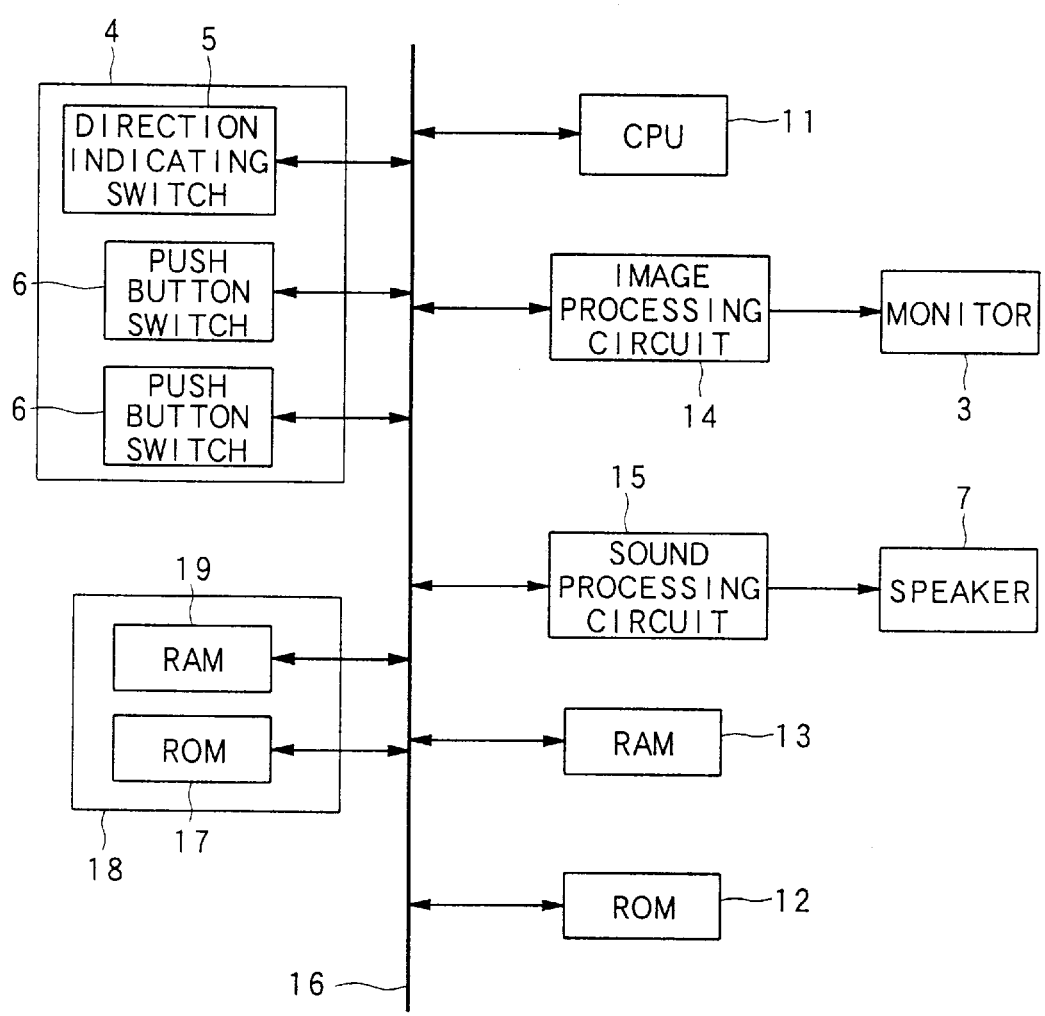
FIG. 2 is a diagram showing a brief configuration of a control device to be mounted on the portable game device in FIG. 1.

FIG. 2 shows a configuration of a control device 10 provided at the game device 1. The control device 10 is configured as a computer whose main part is a CPU 11 utilizing a microprocessor. ROM 12 and RAM 13 that are main storage devices, an image processing circuit 14, and a sound processing circuit 15 are connected, respectively, to the CPU 11 via a bus 16. A program required for basic control (for example, startup processing) of the game device 1 is stored in the ROM 12. A work region for the CPU 11 is allocated in the RAM 13. The image processing circuit 14 controls the liquid crystal monitor 3 according to a drawing instruction from the CPU 11, and displays a predetermined image on the screen. The sound processing circuit 15 generates an analog audio signal according to a pronunciation instruction from the CPU 11, and outputs the signal to a speaker 7.

The switches 5 and 6 each of the input device 4 are connected to the CPU 11 via the bus 16, whereby the CPU 11 can discriminate an operation state of each of the switches 5 and 6. In addition, an external storage device 17 independent of the control device 10 is connected to the bus 16. The external storage device 17 is configured in a cassette shape attachable to/detachable from the main body 2, for example, and ROM 18 and RAM 19, for example, are provided therein as storage media. A program for causing the control device 10 to function as each device of the present invention and various data required for executing the program are recorded in advance in the ROM 18. Game save data or the like, for example, is recorded in the RAM 19 as required. The data contained in the RAM 19 is held by an auxiliary battery incorporated in the external storage device 17, for example. A rewritable ROM such as an EEPROM may be used instead of the RAM 19. As the storage medium of the external storage device 17, various storage media such as magnetic storage medium, optical storage medium, magneto-optical storage medium and the like may be used without being limited to a semiconductor storage element. An interface circuit (not shown) is interposed between the bus 16 and each element as required. In a configuration of the control device 10, a various control devices may be used without being limited to the above.

Figure 3:
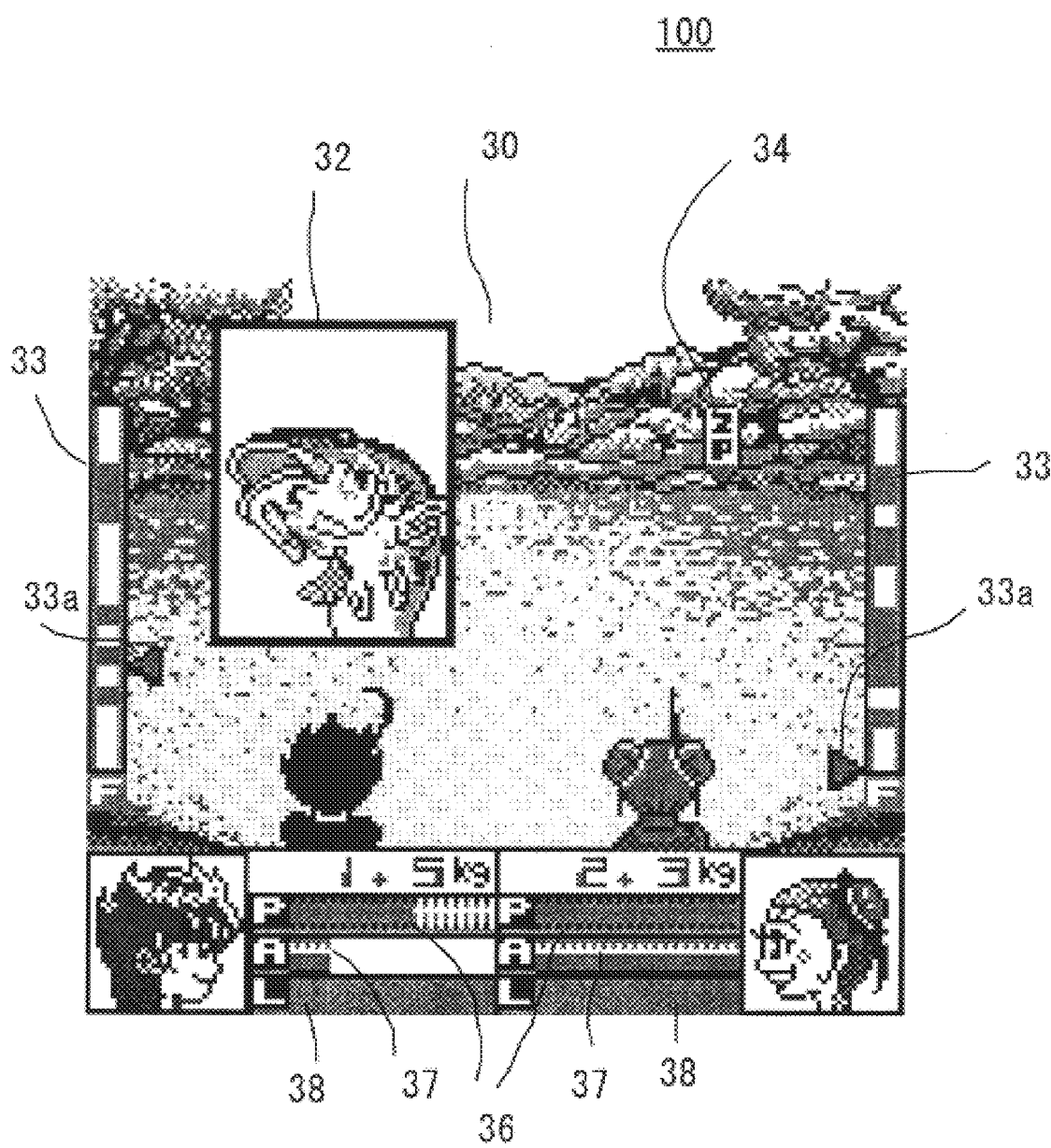
FIG. 3 is a view showing an example of a game screen displayed on the portable game device in FIG. 1.

FIG. 3 shows one screen of a fishing game executed by a program recorded in the external storage device 17. A screen 100 shown in FIG. 3 is displayed when a fishing is performed, and a scene in which two game characters 31, 31 are fishing in line is displayed on a main screen 30 of the above screen. A player holding the game device 1 operates either one of these characters via the input device 4, whereby one character performs lure casting or retrieval, and can compete with the other character in fishing result. The other character is controlled by the CPU 11, for example. In the case where a communication apparatus is provided at the control device 10, the other character may be operated by the player operating another game device 1.

A subsidiary screen such as an animation window 32 is displayed to be superimposed on the main screen 30 as required. The subsidiary screen is used to display lure operation guidance, a variety of information and the like. When such display is not required, the subsidiary screen is cleared. The animation window 32 in FIG. 3 is adopted to display an image showing an appearance in which a fish is caught by a lure. Fish school gages 33, 33 are displayed at the right and left of the main screen 30. The fish school gage 33 is formed in a vertically elongated rectangular shape, in which a fish distribution state from each character 31 to a pointer 34 is displayed. The details are described later. The pointer 34 is displayed as a mark indicating a lure casting direction when each character 31 casts a lure. In order to clarify the discrimination of the characters 31, 31, a characters "1P" is displayed for the pointer 34 assigned to the left side character 31 in FIG. 3, and a character "2P" is displayed for the pointer 34 assigned to the right side character 31. In FIG. 3, only a pointer 34 assigned to the right side character 31 is displayed.

A fishing result meter 35, a power meter 36, an appeal meter 37, and a line tension meter 38, are displayed downward of the main screen 30. A mass of the fishes caught by each character 31 is digitally displayed on the fishing result meter 35. A force (power) caused when each character 31 casts a lure is displayed on the power meter 36. When the meter 36 is at the left end, the power is minimal. When the meter 36 swing to the right end, the power is maximal.

A lure casting position caused by the character is determined to be associated with the power displayed by the power meter 36 and the position of the pointer 34. That is, when a lure is cast, the power meter 36 repeats expansion and contraction at a predetermined period. The pointer 34 moves the inside of the main screen 30 in the crosswise direction according to a predetermined casting direction selecting operation (preferably, crosswise operation of the direction indicating switch 5) for the input device 4. When the player performs a predetermined casting operation (for example, push operation of the push button switch 6), the lure arrival distance is computed in proportion to the power indicated by the meter 36 at that time. A lure is cast at a position corresponding to the computed arrival distance of a line for connecting the character 31 to the pointer 34.

The appeal meter 37 is used to indicate a lure appeal degree against a fish. When the meter 37 is at the left end, the appeal degree is minimal. When the meter 37 swings to the right end, the appeal degree is maximal. A fish cannot be caught in a case other than when the appeal degree is maximum. The appeal degree is increased when the player operates a lure faithfully in response to an instruction for lure action displayed on a lure window 50A shown in FIG. 6 or a lure window 50B shown in FIG. 8. These lure windows 50A and 50B will be described later in detail.

Now, a fish school gage 33 will be described with reference to FIG. 4. For the fish school gage 33, the display content is controlled based on allocation of fishes in a detection range 41 of a predetermined width W set between a position (casting start position) Pa of the character 31 and a position (predetermined casting position) Pb of the pointer 34. The width W is set as a range in which a lure can attract a fish. In the illustrative embodiment, although the player can select a lure for use in fishing from a plurality of lures, the width W may be set constantly irrespective of a lure type or may be changed according to lure type. Further, the detection range 41 is divided into a plurality of intervals 42, . . . 42 in its longitudinal direction.

On the other hand, the underwater portion on the main screen 30 is divided into a plurality of regions 40 . . . 40 (one region is shown to be hatched in FIG. 4), and fish allocation is determined by the CPU 11 with respect to each one of these regions 40 when fishing is started. The fish allocation may be computed for each region 40 by using a predetermined formula when a need to determine the allocation occurs. Alternatively, a plurality of data is produced with respect to fish allocation and recorded in the ROM 18, and one of these items of data may be selected when a need to determine the allocation occurs. These techniques are adopted in a general fishing games as well, and the detailed description is eliminated. Fish allocation is determined in consideration of actual fish behavior. For example, a large fish is prone to act comparatively singly, and small fishes are prone to act in school. Fish allocation for each region 40 is determined in consideration of such behavior.

When a need to display the fish school gage 33 occurs, fish allocation (the presence or absence of fish) concerning each one of intervals 42 is detected by means of the CPU 11 based on a correlation between each interval 42 and the region 40. For a correlation between the interval 42 and the region 40, for example, the region superimposed with the interval 42 at a predetermined rate (for example, 50%) or more may be handled as a region 40 corresponding to the interval 42.

Each interval 42 in the detection range 41 is associated with each position in the fish school gage 33 so that the character position Pa is positioned at the lower end of the fish school gage 33, and the predetermined casting position Pb is positioned at the upper end of the fish school gage 33. An interval in which a fish is present and an interval in which a fish is absent are discriminated respectively by different colors, whereby the fish school gage 33 is produced. That is, the detection result on the fish distribution in each interval 42 in the detection range 41 is displayed at each position on the gage 33 so that a distance from one end of the detection range 41 is replaced with a distance from a lower end of the gage 33. In FIG. 4, a hatched coloring portion A (including A1 and A2) represents a portion at which a fish is detected. An open portion B represents a portion at which no fish is detected.

Thus produced fish school gage 33 reflects a fish distribution state between the character position Pa and the predetermined casting position Pb. As described above, in the case where fish allocation is determined in consideration of a way of schooling according to the fish size, a long colored portion A1 indicates that a number of small fishes forms a school, and a short colored portion A2 indicates that a small number of large fishes are present. A triangular cursor 33a indicating a current lure position is also displayed in the fish school gage 33.

Figure 4:
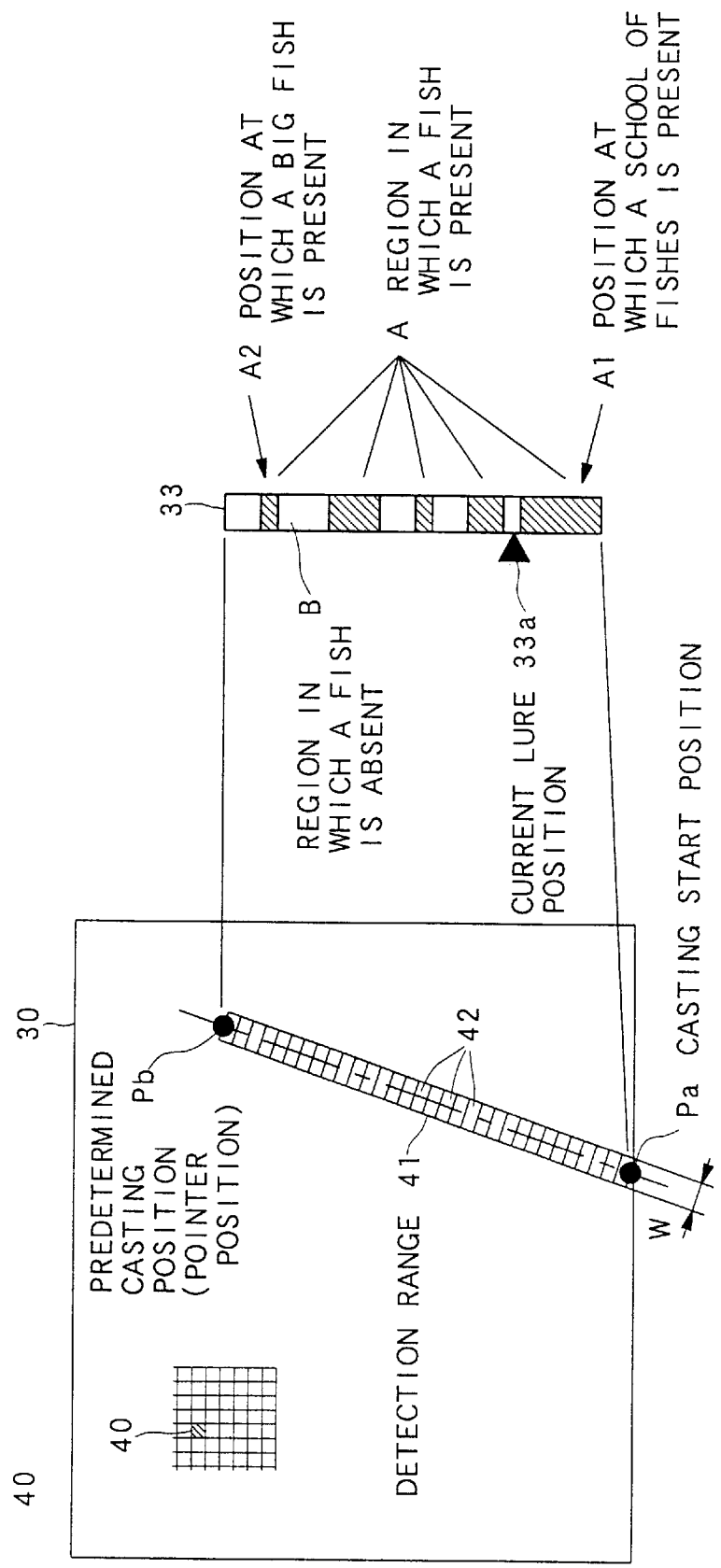
FIG. 4 is a diagram for illustrating the content of a fish school gage to be displayed at both ends of the screen shown in FIG. 3.
Figure 5:
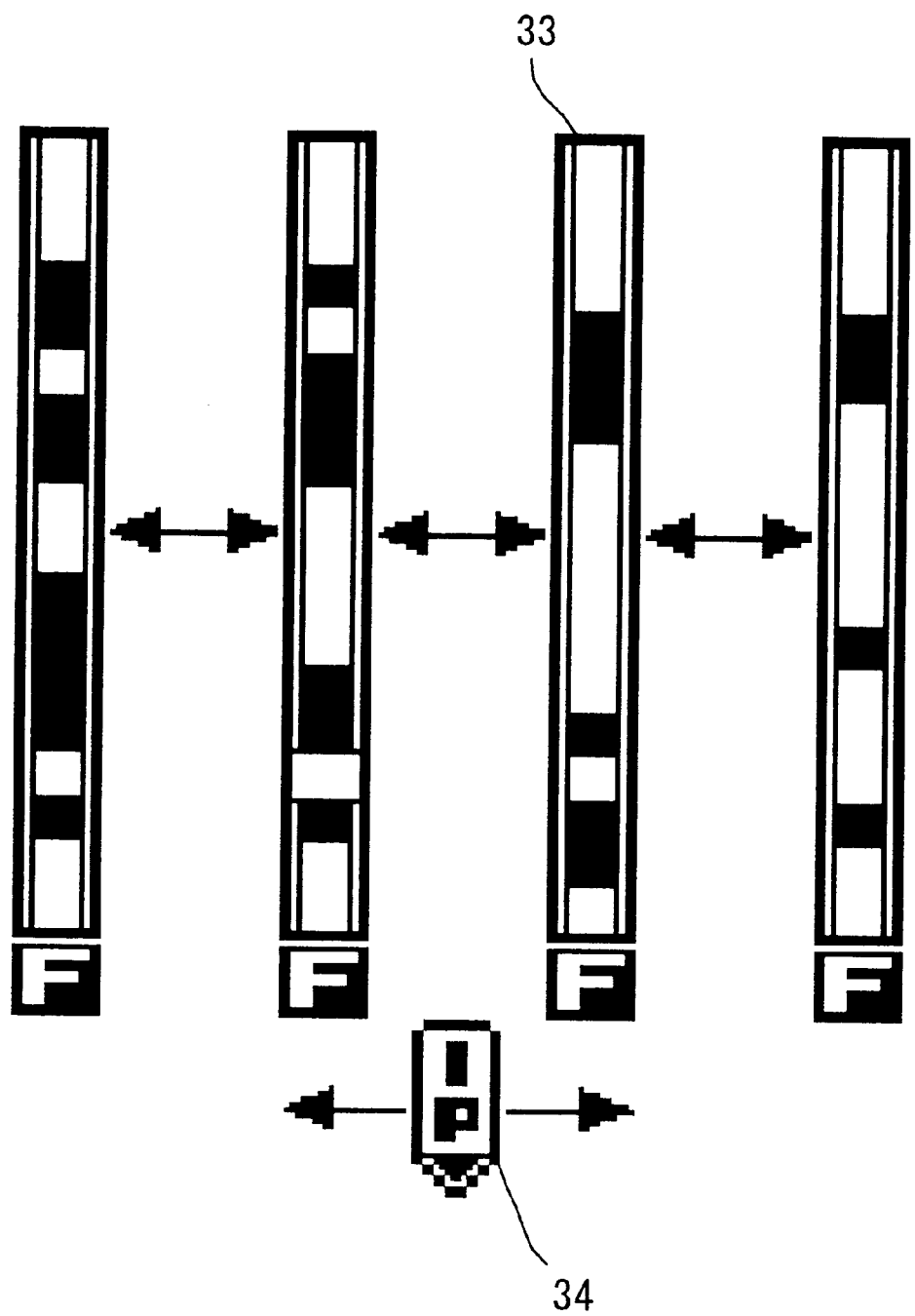
FIG. 5 is a view showing an appearance in which the display contents of the fish school gage in FIG. 4 change in accordance with pointer movement.

When the pointer 34 shown in FIG. 3 moves in the crosswise direction of the main screen 30 according to the player's operation, the predetermined casting position Pb shown in FIG. 4 also moves accordingly. Therefore, even if the fish allocation in the main screen 30 is not changed, when the pointer 34 moves, the display of the fish school gage 33 changes accordingly as shown in FIG. 5. In FIG. 5, although the fish school gage 33 is shown upward of the pointer 34 in order to clarify a relationship between the crosswise movement of the pointer 34 and a change in the fish school gage 33, the display position of the fish school gage 33 is fixed at the right and left ends of the main screen 30 as shown in FIG. 3. In FIG. 5, the rate of the coloring portion A is maximal in the fish school gage 33 at the left end. If casting is performed at this moment, the probability that small fishes are caught is maximal. However, there is also a high probability that fishes are caught. In contrast, if casting is performed when the right end fish school gage 33 is displayed, although there is a low probability that fishes are caught, a large fish can be reliably aimed at.

Conventional fishing games have merely provided the player with information to an extent such that a fish shape is displayed at a place at which fishes form a school. In contrast, according to the aforementioned fish school gage 33, a fish distribution up to the predetermined casting position Pb is shown in detail, and thus, the fish distribution state can be grasped within the wide range by changing the predetermined casting position Pb. Therefore, the player can select a fishing style according to his or her preference. An element in which a fishing style is selected according to the game rule can be included in the game. For example, if there is established the rule in which one who catches the largest number of fishes within a predetermined time is determined as a winner or a rule in which one who catches the biggest fish is determined as a winner, a need to change a fishing style according to the rule occurs, but a casting position suitable for the rule can be easily selected by referring to the above fish school gage 33.

The position Pa of the character 31 may be changed by an operation for the input device 4 (for example, crosswise operation of the direction indicating switch 5). The fish school gage 33 may extend in the crosswise direction of the screen without being limited to a gage which extends in the vertical direction. For example, if a game is designed as such type in which a lure is cast or retrieved in the crosswise direction of the screen, it is considered to display an elongated fish school gage 33 at the upper end or lower end of the screen 30. The detection range 41 may be determined within the partial range on a line connecting the casting start position Pa and the predetermined casting position Pb with each other without being limited to the entire length on the line. Further, arbitrary two points are set in a fishing spot according to the player's operation, and the detecting range 41 may be set on a line between these points.

In a fishing game according to the illustrative embodiment, as in actual lure fishing, various types of lures are provided. Information specific to each lure is set, and these items of information are recorded as data required for a game in advance in the ROM 18 of the external storage device 17. Information of each lure contains, for example, lure name, lure type, image data on lure used and the like. As described above, in the case where the width W of the detection range 41 shown in FIG. 4 is changed according to lure type, information for setting the width W can be contained in the information specific to the lure.

Lures used for actual fishing can be classified from various points of view. For example, in view of a water depth to be applied, there exist a top lure used at a water level, a bottom lure used near the bottom of water, a shallow lure used at a shallow water depth, and a middle lure used at an intermediate water depth. In view of a relationship between the retrieve operation and the lure action, there exist: a lure type of which the lure sinks when it is pulled and the lure floats when it is left; a lure type of which the lure floats when it is pulled and the lure sinks when it is left; a lure type of which the lure is maintained at a substantially predetermined water depth irrespective of the presence or absence of the retrieve operation and the like. The information specific to each lure recorded in the ROM 18 contains information for identifying which type each lure is classified into. The more detailed lure classification is, the more the reality of the game is enhanced. Alternatively, when the classification is increased, the lure data quantity increases, and the throughput requested for the game device 1 is increased. Therefore, it is desirable that the detail level of information specific to each lure is set within a reasonable range in view of the throughput of the game device 1.

Figures 6A, 6B, 6C:
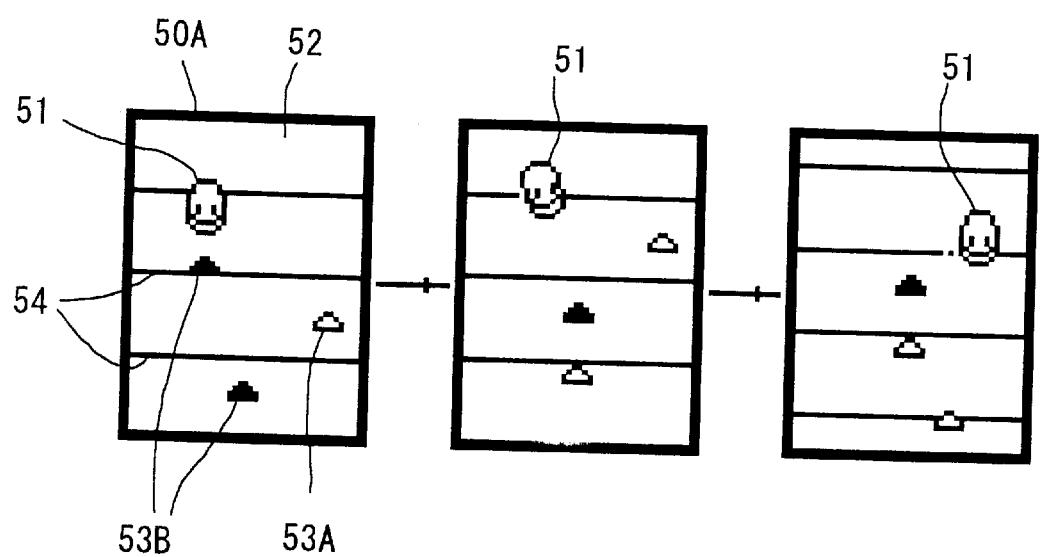
FIGS. 6(a) to 6(c) are views showing an example of a lure window displayed to be superimposed on the main screen in FIG. 3.
Figure 7:
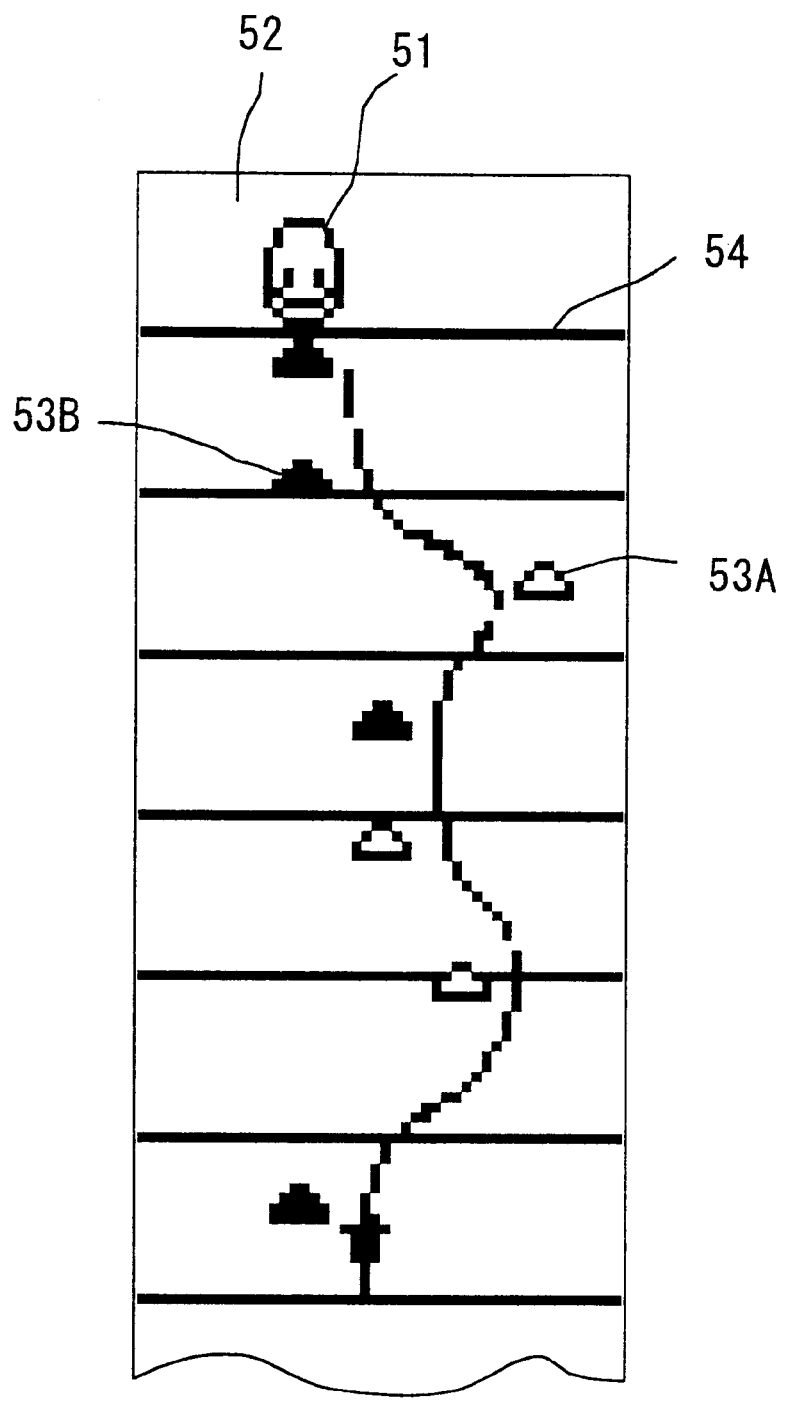
FIG. 7 is a view showing an appearance in which a lure is operated in accordance with an instruction from the lure window in FIG. 6.
Figures 8A, 8B, 8C:
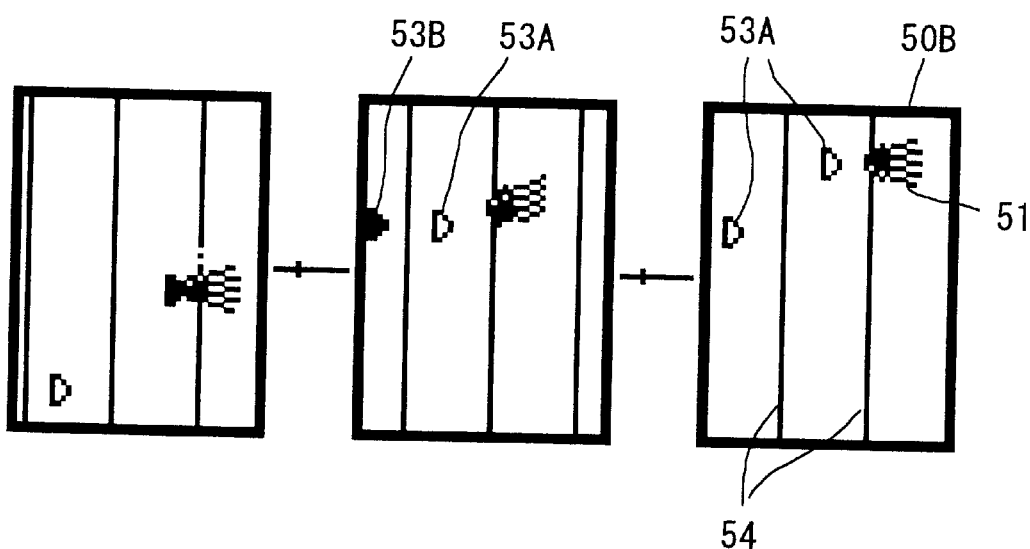
FIGS. 8(a) to 8(c) are views showing another example of a lure window displayed to be superimposed on the main screen in FIG. 3.

Now, a method of guiding a lure operation to a player will be described with reference to FIGS. 6 to 9. When the player operates a character 31 that is an operation target to cast a lure, a first type of lure window 50A shown in FIG. 6 or a second type of lure window 50B shown in FIG. 8 is displayed as a subsidiary screen corresponding to the character 31 that is the operation target. In FIGS. 6 and 8, three sets of the windows 50A and 50B are displayed respectively to be listed with time being changed in order to indicate a change of the display contents of the lure windows 50A and 50B with an elapse of time. In these figures each, the time advances in order of (a)→(b)→(c).

The first type of lure window 50A shows an appearance in which a lure 51 abstracted as a first image swims on a water level or underwater viewed from the top, wherein the downward side of the window 50A corresponds to the advancing direction (retrieving direction) of the lure 51. On the other hand, the second type of lure window 50B shows an appearance in which the abstracted lure 51 swims underwater along the vertical cross section, wherein the left side of the window 50B corresponds to the advancing direction (retrieving direction) of the lure 51. Whether the lure window 50A or lure window 50B is used is determined depending on lure type. Therefore, the information specific to the lure recorded in the external storage device 17 is required to contain the information for specifying either one of the lure windows 50A and 50B. As such at information, for example, information for specifying lure type can be used. Table format data in which a lure and a lure window 50 to be used by each lure are associated with each other may be recorded in the ROM 18.

The lure window 50A is convenient to display actions of the lure 51 in the crosswise direction, and the lure window 50B is convenient to display actions of the lure 51 in the vertical direction. Therefore, with respect to a lure type without a change in water depth, the lure window 50A is preferably used. Alternatively, with respect to a lure type with a change in water depth, the lure window 50B is preferably used. In the following description, when it is unnecessary to discriminate the lure windows 50A and 50B with each other, it is expressed as the lure window 50.

The lure window 50 is displayed at an upward position of the character 30. For example, when a left side character 31 shown in FIG. 3 is specified as an operation target, the lure window 50 is displayed instead of an animation window 32. As shown in FIGS. 6 and 8, a background 52 is displayed on the lure windows 50A and 50B together with the lure 51. On the background 52, rectangular marks 53A and 53B are displayed as a second image which functions as a reference indicating a position through which the lure 51 passes. In addition, a partition lines 54 . . . 54 with a plurality of constant intervals extending in the crosswise direction (transverse direction) of the lure window 50A are displayed.

In the case where the lure window 50A shown in FIG. 6 he is displayed, the lure 51 moves within the lure window 50A in the crosswise direction according to a predetermined course change operation for the input device 4. In this case, the course change operation images an operation in which a fishing rod is swung horizontally in actual fishing, thereby causing the lure to be meandered horizontally. Therefore, it is desirable that a crosswise operation of the direction indicating switch 5 is allocated as the course change operation. The background 52 is displayed to be scrolled at a predetermined speed from the top to the bottom of the window 50A together with the marks 53A and 53B and partition line 54. That is, as shown in FIG. 7, in the case of the lure window 50A, the background 52 is configured as a vertically elongated band shaped image, and part of the background 52 is displayed on the lure window 50A. The display range is gradually displaced downwardly, and the background 52 in the window 50A is scrolled. By scrolling the background 52, there is expressed an appearance in which the lure 51 is retrieved toward the character 31 while the lure meanders horizontally according to a course change operation for the input device 4.

Marks 53A and 53B each indicate a position through which the lure 51 passes in the case where adequate action is provided to the lure 51. In addition, the marks 53A and 53B are discriminated from each other by colors. When the player operates the lure 51 horizontally so that the lure can pass on the mark 53A, an appeal degree (value of the appeal meter 37) increases. In addition, when the lure 51 passes on the mark 53B, if a predetermined appeal operation (coordination operation) is made according to the passing, the appeal degree increases. This appeal operation images an operation in which a fishing rod is swung upwardly, thereby moving the lure 51 vertically. For example, it is desirable that upward operation caused by the direction indicating switch 5 is set as the appeal operation. If the lure 51 comes out of the mark in 53A or if an appeal operation is not made properly, the appeal degree is lowered.

On the other hand, in the case where the lure window 50B in FIG. 8 is displayed, the lure 51 moves within the window 50 vertically according to the course change operation caused by the player via the input device 4. In this case, the course change operation images an operation in which a speed for retrieving a lure (pulling speed) is changed in actual fishing, thereby changing the depth. For example, it is desirable that the lure 51 is regarded as being pulled by the operation in the left direction of the direction indicating switch 5. That is, in the case where the lure 51 is of such type that the lure sinks when it is pulled and the lure rises when it is left, when the direction indicating switch 5 is operated in the left direction, the lure 51 is displaced downwardly so that the lure 51 is pulled. If such operation is not made, the lure 51 is gradually rising with a constant rate. Conversely, in the case where the lure 51 is of such type that the lure rises when it is pulled and the lure sinks when it is left, when the direction indicating switch 5 is operated in the left direction, the lure 51 is displaced upwardly. When such operation is not made, the lure 51 is gradually displaced downwardly at a constant rate.

Figure 9:
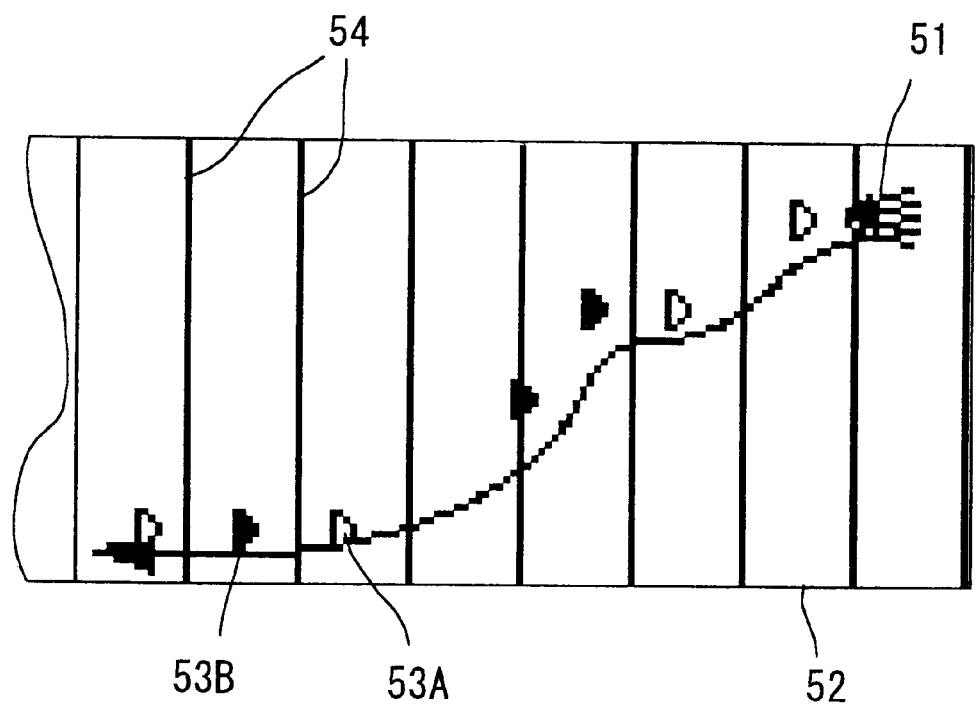
FIG. 9 is a view showing an appearance in which a lure is operated in accordance with an instruction from the lure window in FIG. 8.

In the lure window 50B shown in FIG. 8, the background 52 is displayed to be scrolled at a predetermined speed from the left to the right of the window 50A together with the marks 53A and 53B and the partition line 54. That is, as shown in FIG. 9, in the case of the lure window 50B, the background 52 is configured as a horizontally elongated band shaped image, and part of the background 52 is displayed on the lure window 50B. Then, the display range is gradually displaced to the left, and the background 52 in the window 50B is scrolled. By scrolling the background 52, there is expressed an appearance in which the lure 51 is retrieved toward the character 31 while a depth is changed according to the course change operation for the input device 4.

The marks 53A and 53B each, as in an example shown in FIG. 6, indicate a position through which the lure 51 passes when adequate action is provided to the lure 51. The marks 53A and 53B are discriminated from each other by colors. When the player changes the depth of the lure 51, thereby the lure 51 can pass on the mark 53A, the appeal degree (the value of the appeal meter 37) increases. In addition, when the lure 51 passes on the mark 53B, if a predetermined appeal operation (for example, upward operation caused by the direction indicating switch 5) is made according to the passing, the appeal degree increases. If the lure 51 comes out of the mark 53A or if an appeal operation is not made properly, the appeal degree is lowered.

According to the above lure windows 50A and 50B, as shown in FIGS. 7 and 9 respectively, when the player operates the lure 51 via the input device 4, thereby moving the lure 51 faithfully to the marks 53A and 53B, the appeal degree gradually increases toward the maximum value so that a fish can be caught. In this manner, operation of the lure 51 is guided to the player, and the value of the appeal meter 37 is changed according to whether or not the player's operation for the guidance is proper. Thus, the player can always grasp whether or not his or her lure operation is proper, and feels sufficient response to his or her lure operation. The trajectory of the lure shown in FIGS. 7 and 9 each is not displayed in the actual lure windows 50A and 50B.

Data on the allocation of the marks 53A and 53B in the background 52 can be recorded in the ROM 18 of the external storage device 17 by producing the data in advance. The data on the allocation of the marks 53A and 53B may be produced by each lure 51 or by type of the lure 51. Alternatively, the allocation of the marks 53A and 53B may be determined by utilizing random numbers. The difficulty concerning operation of the lure 51 can be changed according to the allocation of the marks 53A and 53B. Thus, a plurality of items of data having different difficulties are provided on the ROM 18, the data on higher difficulty is selected as the game is advanced more, and the data may be used to display the lure window 50. While a lure is provided to the player as a reward when one wins the game, and then, the lure performance is improved more as the player wins the game successively, the difficulty of the requested operation may be increased.

Figure 10:
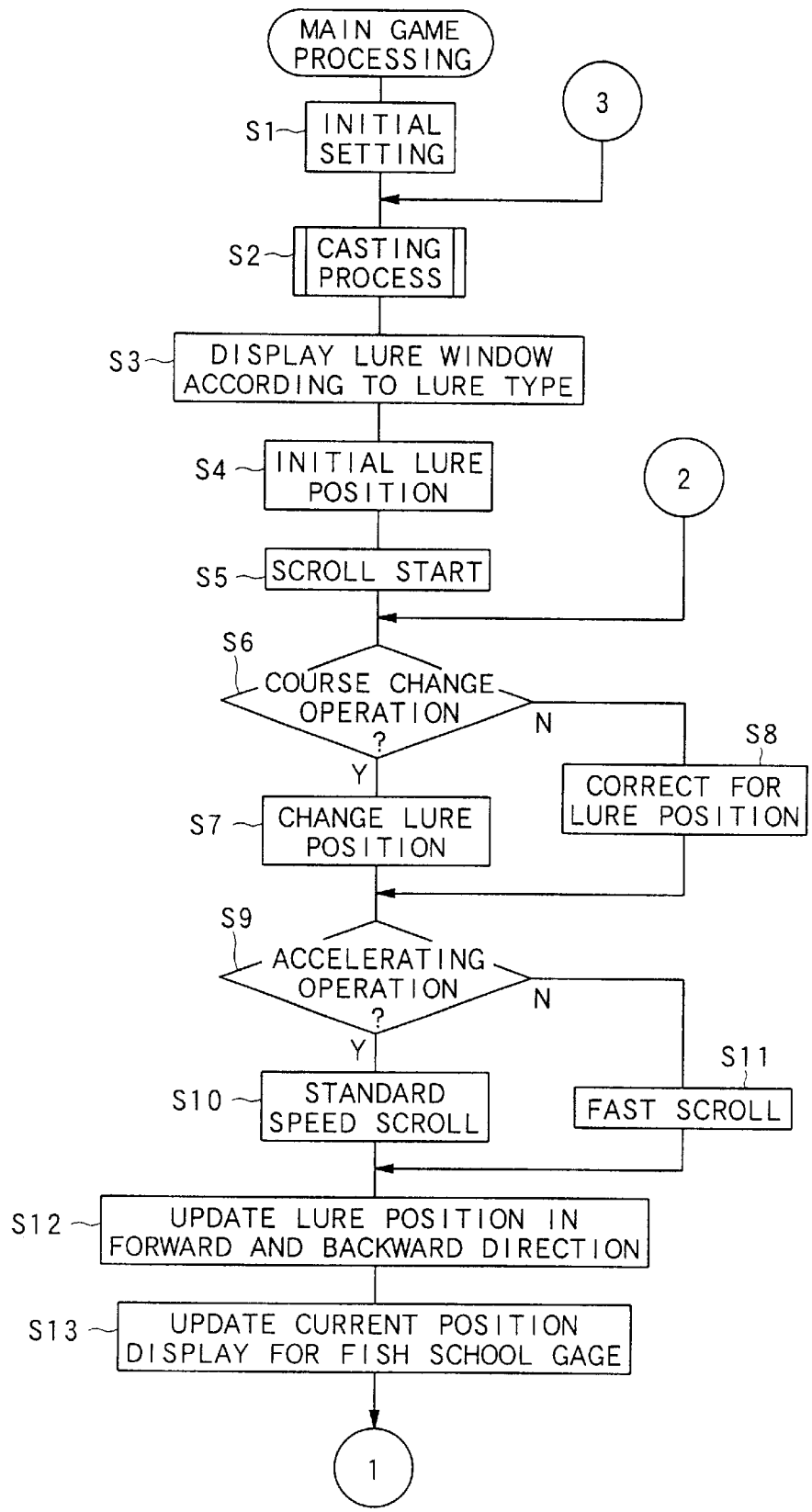
FIG. 10 is a flowchart showing the procedures for main game processing executed by a CPU of the control device in FIG. 2.
Figure 11:
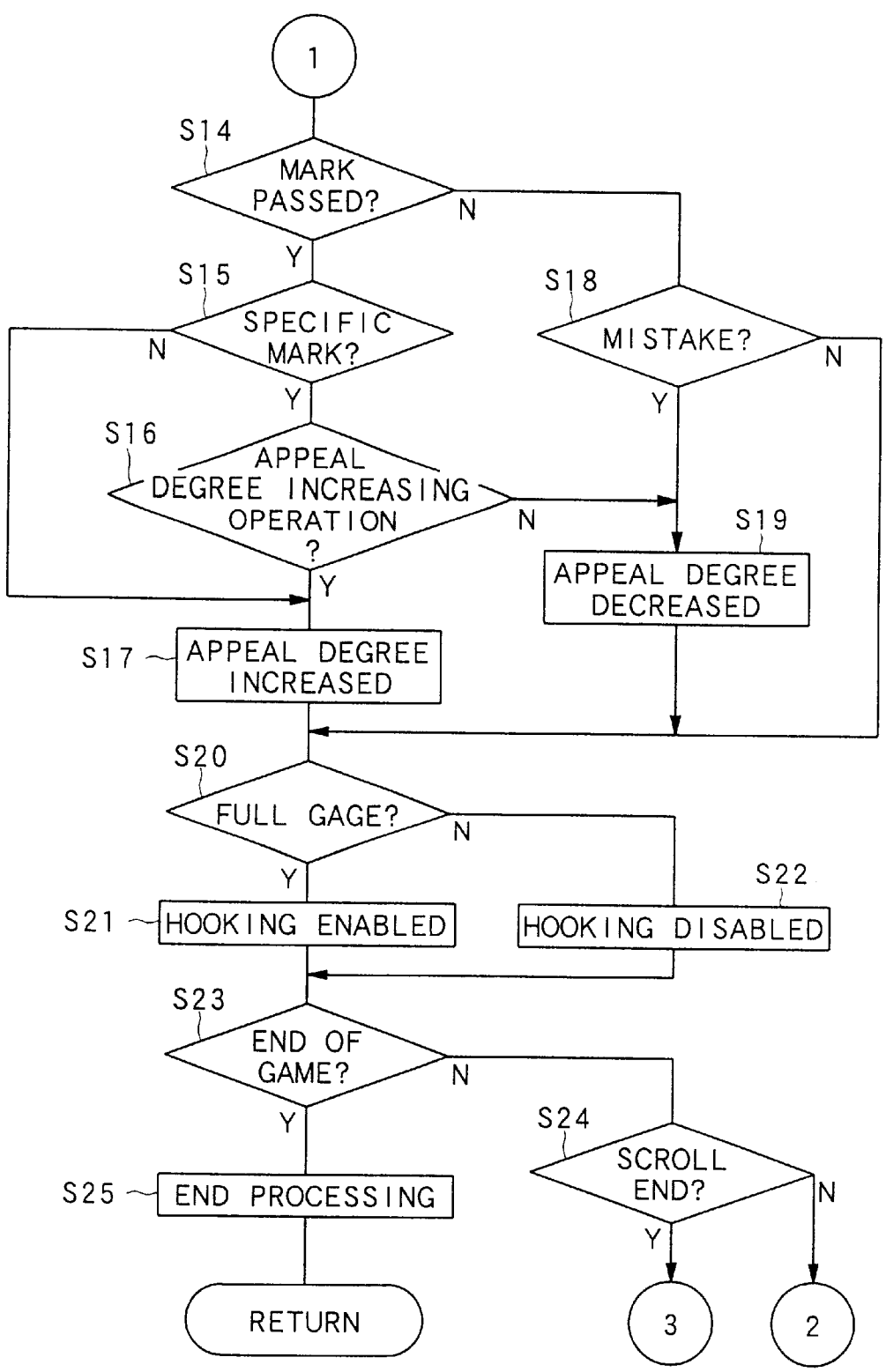
FIG. 11 is a flowchart following FIG. 10.

Now, various processings for a fishing game that the CPU 11 executes in accordance with a program recorded in the external storage device 17 will be described with reference to FIGS. 10 to 13. FIGS. 10 and 11 are flowcharts illustrating the procedures for main game processing executed when a fishing game is performed.

In main game processing, initial conditions required for performing a fishing game is first set (step S1). Then, casting processing is performed (step S2). The casting processing is adopted to determine a lure casting position by referring to a signal from the input device 4, and the procedures will be described later. When the casting processing is terminated, the lure window 50A shown in FIG. 6 or the lure window 50B shown in FIG. 8 is displayed according to the lure type (step S3). Data for specifying a position of the lure 51 in the background 52 (position data) is set to an initial value, and the lure 51 is displayed at the initial position in the window 50 (step S4).

Thereafter, the scrolling of the background 52 is started (step S5), and then, it is judged whether or not a lure course change operation is made (step S6). The course change operation has been described above. If a course change operation is made, the position data on the lure 51 is changed according to the operation content, and accordingly, the display position of the lure 51 is changed to the transverse direction of the window 50 (i.e., the crosswise direction shown in FIG. 6 or the vertical direction shown in FIG. 8) (step S7). When it is judged that a course change operation is not made at step S6, the vertical position data is adjusted by a predetermined quantity according to the lure type (step S8). This adjustment is performed to express an appearance in which the lure 51 rises or sinks when the lure window 50B shown in FIG. 8 is used. A quantity of one adjustment is preset by each lure 51, and is recorded in the ROM 18. When the lure window 50A shown in FIG. 6 is used, the adjustment is not performed.

After processing at step S7 or step S8, it is judged whether or not a predetermined accelerating operation is made for the input device 4 (step S9). If such accelerating operation is not made, the background 52 is scrolled at a standard speed (step S10). When such accelerating operation is made, the background 52 is scrolled at a high speed (step S11). Then, data indicating the lure position on the main screen 30 and in the forward and backward direction in the background 52 is updated according to a scroll quantity (step S12). Further, the position of a cursor 33a in the fish school gage 33 is updated according to the current lure position (step S13). Thereafter, processing is advanced to step S14 shown in FIG. 11.

At step S14, it is judged whether or not the lure 51 passes on the mark 53A or 53B. In this case, a range of a predetermined width is set in the transverse direction of the window 50 around the marks 53A and 53B. When the lure 51 passes through this range, it is judged that the lure 51 passes on the mark 53A or 53B. When step S14 is affirmatively judged, it is judged whether or not the lure 51 passes on the mark 53B required for an appeal operation (step S15). When it is affirmatively judged, it is successively judged whether or not the aforementioned appeal operation is made in synchronism with the lure 51 passing on the mark 53B (step S16). In this case, a predetermined allowable range is set before and after a timing with which the lure 51 passes through the mark 53B. If an appeal operation is within the allowable range, it is judged that the appeal operation is made in synchronism with the lure 51 passing through the mark 53B.

In the case where it is judged that an appeal operation is made at step S16 or in the case where it is judged that the lure does not pass on the mark 53B at step 515 (which implies that the lure passes on the mark 53A), the appeal degree stored in the RAM 13 is increased by a predetermined quantity, and accordingly, the display of the appeal meter 37 is updated (step S17). Thereafter, processing is advanced to step S20. In the case where step S14 is negatively judged, it is judged whether or not the course of the lure 51 is mistaken, i.e., whether or not the lure 51 eludes the mark 53A or 53B (step S18). When the course is judged to be mistaken, the appeal degree stored in the RAM 13 is reduced by a predetermined quantity, and accordingly, the display of the appeal meter 37 is updated (step S19).

Thereafter, processing is advanced to step S20. This applies to a case where no appeal operation is made at step S16. In the case where the course is judged to be not mistaken at step S18 (at that time, in the case where the mark 53A or 53B does not exist at both sides of the lure 51), step S19 is skipped, and processing is advanced to step S20.

At step S20, it is judged whether or not the appeal degree stored in the RAM 13 is maximal, i.e., whether or not the appeal meter 37 reaches its right end. If it is affirmatively judged, data for judging whether or not hooking (a state in which a fish is caught by a lure) recorded in the RAM 13 is enabled or disabled is set to a value corresponding to hooking enabled (step S21). If it is negatively judged, the data is set to a value corresponding to hooking disabled (step S22).

Next, it is judged whether or not a predetermined condition for the end of the game is met (step S23). In the case where it is negatively judged, it is judged whether or not scrolling is ended successively, i.e., whether or not the lure is retrieved to a predetermined position of the main screen 30 (a position corresponding to the lower end of the fish school gage 33) (step S24). When it is negatively judged, processing is returned to step S6. If it is affirmatively judged, processing is returned to step S2. At step S23, if the end of the game is judged, predetermined end processing is performed (step S25). When this processing terminates, the main game processing completes. As a predetermined condition for the end of the game, a variety of conditions such as elapsed time limitation or the number or mass of the caught fishes exceeding a predetermined value may be set.

Figure 12:
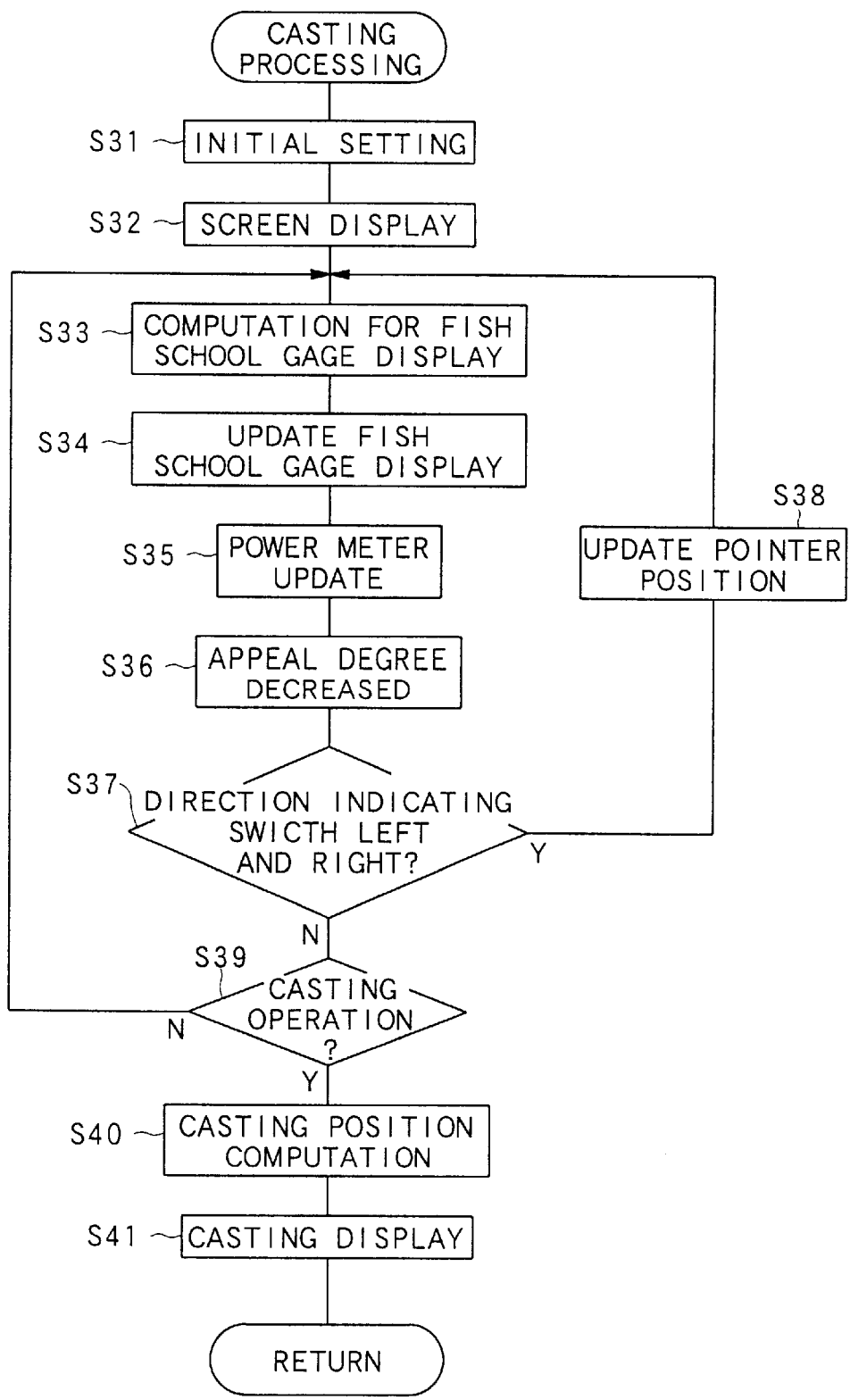
FIG. 12 is a flowchart showing the procedures for casting processing executed as a subroutine process in FIG. 10.

FIG. 12 is a flowchart illustrating the details on casting processing executed at step S2 shown in FIG. 10. In the casting processing, initial setting such as parameters associated with lure casting is first performed (step S31). Then, a casting image is displayed on the main screen 30 (step S32). Further, computation for displaying the fish school gage 33 is performed (step S33). The display of the fish school gage 33 is updated based on the computation result (step S34). The computation and display mode for displaying the fish school gage 33 have been described above with reference to FIG. 4.

Then, the value of the power meter 36 stored in the RAM 13 is increased by a predetermined quantity, and the display of the power meter 36 is updated according to such change (step S35). At this time, if the value of the power meter 36 is maximal, it is reset to be minimal. Then, the appeal degree stored in the RAM 13 is reduced by a predetermined quantity, and accordingly, the display of the appeal meter 37 is updated (step S36). Further, it is judged whether or not the direction indicating switch 5 is operated in the crosswise direction (step S37). If it is affirmatively judged, the position of the pointer 34 is changed by a predetermined quantity in a direction in which the direction indicating switch 5 is operated at step S38, and processing is returned to step S33.

Therefore, after casting processing has been started, processing from step S33 to step S38 is repeatedly executed while the player operates the direction indicating switch 5 horizontally, and then, the pointer 34 of the main screen 30 moves horizontally. Accordingly, a fish distribution state from the position of the character 31 to the pointer 34 is computed, and the display of the fish school gage 33 is updated as shown in FIG. 5. In this manner, the player can determine an optimal casting direction while checking the fish distribution state. However, while the pointer 34 is moved, the value of the appeal meter 37 gradually decreases. Thus, the player needs to determine the casting direction as soon as possible.

In the case where it is judged that the direction indicating switch 5 is not operated horizontally at step S37, it is judged whether or not a predetermined casting operation (for example, push operation of the push button switch 6) is made for the input device 4 (step S39). When it is negatively judged, processing is returned to step S33. When it is affirmatively judged, the casting position is computed based on the value of the power meter 36 and the position of the pointer 34 at that time (step S40). The casting position is set on a line connecting the pointer 34 and the character 31 with each other. A distance from the character 31 is in proportion to the value of the power meter 36 at a time when casting processing is performed. Then, an appearance in which a lure is cast at the computed casting position is displayed (step S41). After these steps, the casting processing completes.

Figure 13:
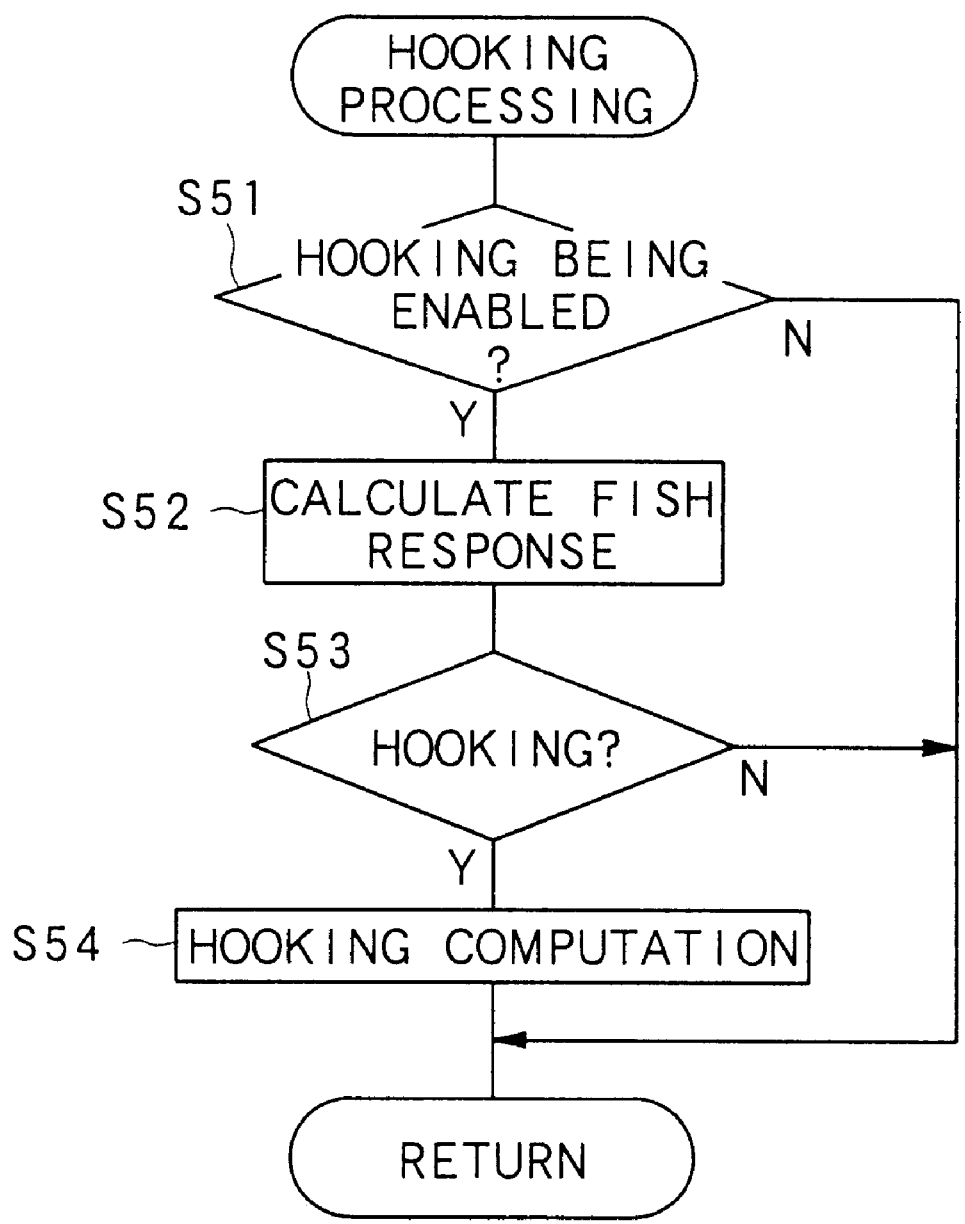
FIG. 13 is a flowchart showing the procedures for hooking processing executed by a CPU of the control device in FIG. 2.

FIG. 13 is a flowchart illustrating the procedures for hooking processing executed by the CPU 11 at a predetermined period in line with the aforementioned processing in FIG. 10 and FIG. 11. In hooking processing, it is judged whether or not data for judging whether or not hooking (a state in which a fish is caught by a lure) recorded in the RAM 13 is enabled or disabled is set to a value corresponding to hooking enabled (step S51). The data is set in the aforementioned step S21 or S22 shown in FIG. 11.

In a state in which hooking is disabled, hooking processing terminates. Therefore, when the appeal meter 37 is not maximal, no fish is caught. In a state in which hooking is enabled, a response of a fish to the lure is computed (step S52). For example, with respect to each one of the fishes within the detection range 41 shown in FIG. 4, the degree of fish response to the lure is computed in accordance with a predetermined formula in consideration of compatibility with lure type, the distance from the lure or the like. In this case, when a lure with its high appeal degree is used, the detection range 41 is set widely. Correspondingly, a range specified as a computation target is expanded at step S52. As a result, the probability that a fish is caught is increased.

However, the detection range 41 for displaying the fish school gage 33 need not always coincide with a range for computing the fish response. When the fish school gage 33 is assumed to be a reference, a response of fishes within a range wider than the detection range 41 may be computed. Even if the fishes are outside of the detection range 41, the fish to be hooked by a lure may be set. Conversely, the response to the lure may be computed for only the fishes within a range narrower than the detection range 41. Even if the fishes are included in the detection range 41, a fish which does not respond to the lure may be set.

In the next step S53, it is judged whether or not hooking is present or absent based on the fish response computation result, that is, whether or not any fish bytes a lure. In the case where hooking is present, processing for performing hooking is performed for the player (step S54). For example, the animation window 32 shown in FIG. 3 is displayed on the main screen 30, and an appearance in which a fish bytes a lure is displayed. In the case where the game device 1 comprises vibration device, hooking may be indicated by vibration.

After hooking has been performed at step S54 or in the case where no hooking is present at step S53, hooking processing completes.

Figure 14:
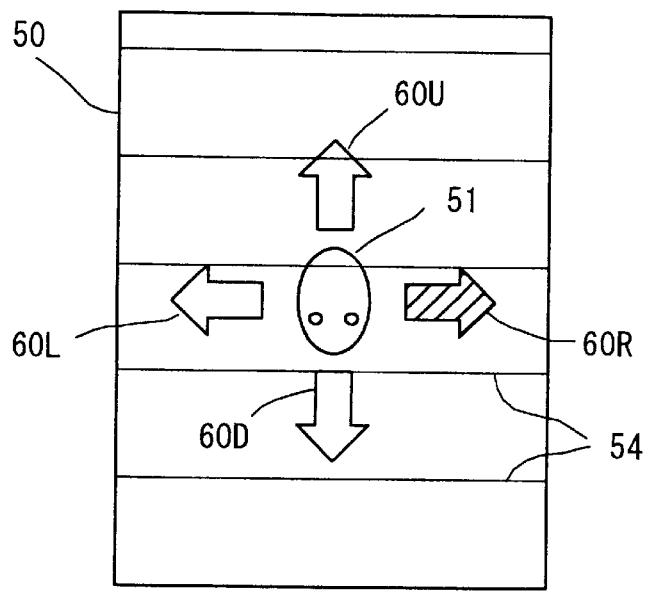
FIG. 14 is a view showing another example of a lure window.

In the aforementioned embodiment, although the mark 53A presents only information concerning a direction in which a lure is operated; and the mark 53B presents information concerning a direction and timing when a lure is operated, either one of these marks may be used. As shown in FIG. 14, arrow shaped direction indicating marks 60U, 60D, 60L, and 60R (that may be represented by reference numeral 60) is disposed vertically and horizontally around the lure 51, which may request that the player should operate the direction indicating switch 5 in the same direction as a lighting mark 60 (a mark 60R lights in FIG. 14).

Figure 15:
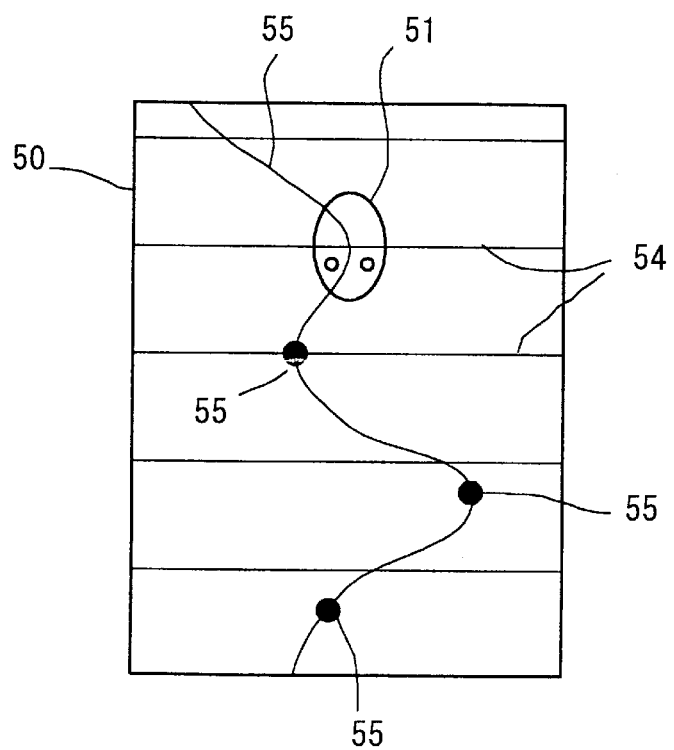
FIG. 15 is a view showing still another example of a lure window.

As shown in FIG. 15, a preferable trajectory curve 55 of the lure 51 may be displayed in the background 52, indicating that the lure 51 is operated along the trajectory curve 55. Further, an appeal point 55a may be set on the trajectory curve 55 as required. When the lure 51 pass through the appeal point, an appeal operation may be requested in the same manner as when the lure passes through the mark 53B.

Figure 16:
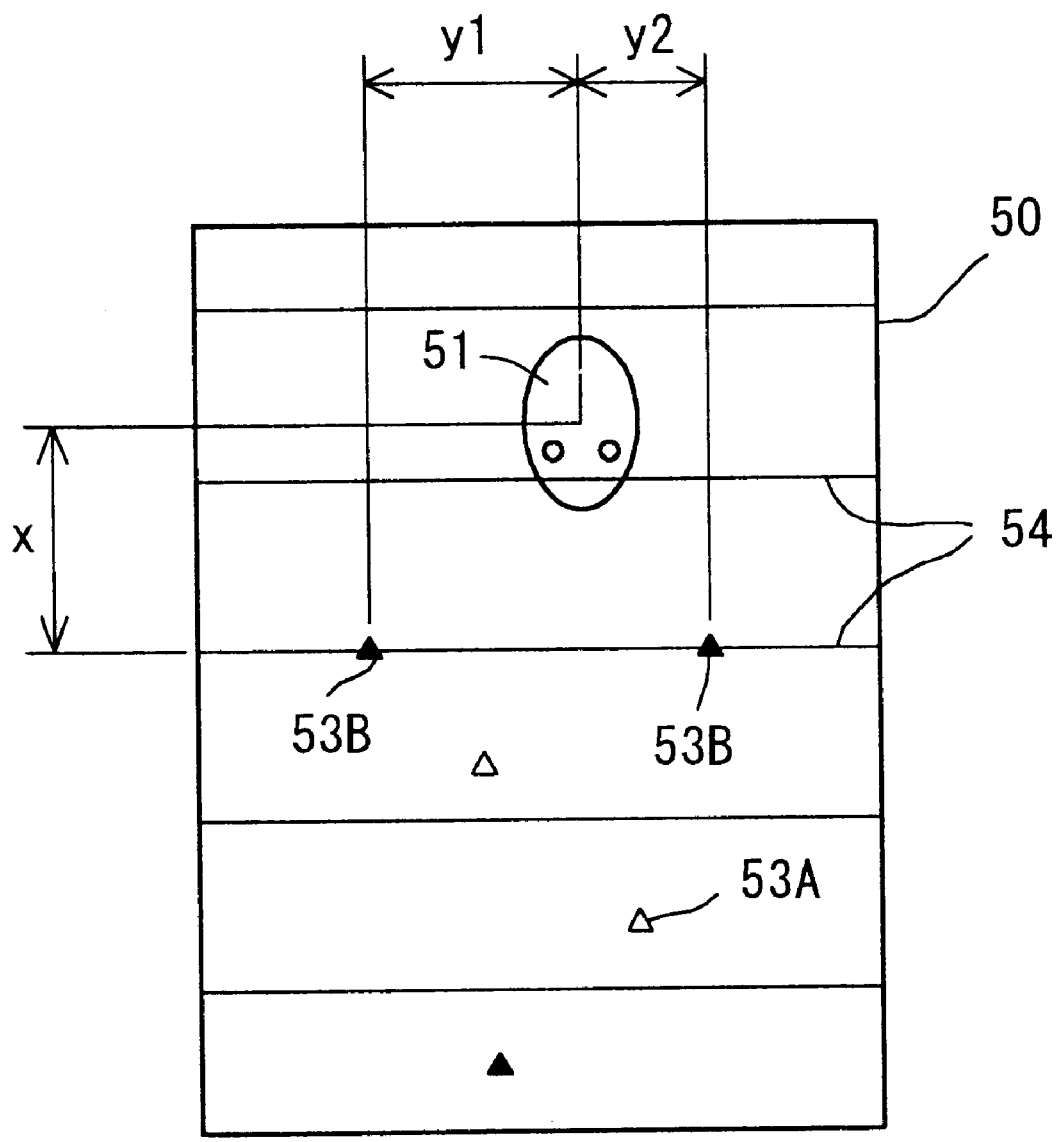
FIG. 16 is a view showing still another example of a lure window.

As shown in FIG. 16, a plurality of marks 53B (or 53A) are arranged in the transverse direction of the lure window 50 so that a difference in increments of the appeal degree may be provided based on a distance 'y' (y1 and y2) from the lure 51 at a point at which the lure 51 is distant from these marks 53B in its advancing direction by a predetermined quantity 'x' to each of the marks 53B. In this case, greater distance 'y' makes it more difficult to make an operation for the passing. Thus, it is reasonable that an increment in appeal degree when the lure passes through a mark 53B with its longer distance 'y' is set to be greater than an increment in appeal degree when the lure passes through a mark 53B with its shorter distance 'y'.

In the processing shown in FIGS. 10 and 11, although the scroll speed of the background 52 is changed according to the presence or absence of an accelerating operation for the input device 4 (steps S9 to S11), such an accelerating operation may be eliminated so that the scrolling speed (corresponding to the retrieving speed of the lure 51) of the background 52 is fixed to a predetermined value. For example, the background 52 may be scrolled at a constant speed so that the lure 51 is merely moved in the transverse direction of the lure window 50 according to a course change operation. A deceleration operation by which a scroll speed is slower than a standard speed may be enabled. In place of, or in addition to a change in scrolling speed, the lure 51 may be moved in the forward and backward direction (the vertical direction shown in FIG. 6 and the crosswise direction shown in FIG. 8) of the lure window 50 according to a retrieving speed change operation for the input device 4.

An increment in appeal degree when the lure 51 passes through a mark 53A may be constant or may be changed according to a condition. For example, in the case where the lure 51 continuously passes through the mark 53A in predetermined number or more, the subsequent increase in appeal degree may be greater than usual. This also applies to an operation for the mark 53B. While an operation of the lure 51 is guided by utilizing the lure window 50, a proper music is reproduced as a background music (BGM) so that the lure 51 may be operated rhythmically. Further, in the case where the lure 51 passes through the mark 53A or when an appeal operation is properly made in accordance with the lure 51 passing through the mark 53B, an effect sound may produced or certain performance may be done for an image.

In the foregoing fishing game, when an appeal degree is maximal, a state which is advantageous to the player is produced by enabling hooking. When the appeal degree reaches within the predetermined range from the maximum value, hooking may be enabled. Alternatively, the probability that a fish is caught may be set to be higher as the appeal degree increases. Further, only when the appeal degree reaches the maximum value, the settings may be provided so that a particularly large fish can be caught or so that a special technique for the character 31 to catch a fish can be used. In short, the player's faithfulness to the lure operation guidance is evaluated in the form of the appeal degree or a score so that the game result may be changed according to the evaluation.

The operation guiding system of the present invention is available for use in guiding operations of various game elements to be made by the player without being limited to the lure operation in a fishing game.

As has been described above, according to the game system of the present invention, the contrivance operation is guided to the player so that the player can operate the contrivance properly in accordance to such guidance as a reference. The guided operation and actual operation are compared with each other, and are evaluated. The above evaluation is notified to the player, and the progress of the fishing game is changed according to the evaluation. Thus, the player concentrates himself or herself on operating a contrivance in order to gain high evaluation. In this manner, the monotonousness regarding work of retrieving a contrivance is eliminated, the player is continuously stimulated, and the player's interest in the fishing game is increased.

In addition, according to the operation guiding system of the present invention, operation guidance to game elements such as contrivance can be properly performed. According to the storage medium of the present invention, a program recorded therein is read and executed by a computer, whereby the control device or operation guiding system of the game system according to the present invention can be provided.

What is claimed is:

1. A game system comprising:
    an image display device;
    an input device for outputting a signal according to a player's operation; and
    a control device for advancing a fishing game utilizing a contrivance in a virtual fishing spot with reference to an output of said input device, and displaying an image according to the progress on a screen of said display device, wherein said control device comprises:
      guide device for guiding a contrivance operation to said player through the screen of said display device;
      evaluation device for comparing an operation guided by said guide device with a contrivance operation caused by said player via said input device, thereby evaluating the contrivance operation caused by said player;
      evaluation notifying device for notifying the evaluation caused by said evaluation device to the player; and
      evaluation reflecting device for changing the progress of said fishing game according to the evaluation caused by said evaluation device.

2. A game system according to claim 1, wherein said guide device presents said player with information concerning a direction of operating said contrivance.

3. A game system according to claim 1 or 2, wherein said guide device presents said player with information concerning a timing of operating said contrivance.

4. A game system according to claim 1, wherein, in said guide device, a first image corresponding to said contrivance and a second image indicating a position through which said contrivance should pass are displayed on a screen of said display device; when said contrivance is retrieved at said virtual fishing spot, said first image is relatively moved in said contrivance retrieving direction relevant to said second image; and said first image and said second image are relatively moved in a direction orthogonal to said contrivance retrieving direction according to a predetermined course change operation for said input device, thereby guiding said contrivance operation.

5. A game system according to claim 4, wherein, in said guide device, when a predetermined course change operation is made for said input device, said first image is relatively displaced in a direction orthogonal to said retrieving direction relatively to said second image; and when said predetermined course change operation is not made, said first image is held at a predetermined position relevant to said second image with respect to said orthogonal direction.

6. A game system according to claim 4, wherein, in said guide device, when a predetermined course change operation is made for said input device, said first image and said second image are relatively displaced in one direction orthogonal to said retrieving direction; and when said predetermined course change operation is not made, said first image and said second image are relatively displaced in the other direction of said orthogonal direction.

7. A game system according to claim 4, comprising mode selecting device for selecting a first mode or a second mode in accordance with a predetermined condition, wherein, in the case where said first mode is selected, in said guide device, when a predetermined course change operation is made for said input device, said first image is relatively displaced in a direction orthogonal to said retrieving direction relevant to said second image; and when said predetermined course change operation is made, said first image is held at a predetermined position relevant to said second image with respect to said orthogonal direction; in said second mode is selected, in said guide device, when a predetermined course change operation is made for said input device, said first image and said second image are relatively displaced in one direction orthogonal to said retrieving direction; and when said predetermined course change operation is not made, said first image and said second image are relatively displaced in the other direction of said orthogonal direction.

8. A game system according to claim 7, wherein said mode selecting device selects said first mode or said second mode according to the type of said contrivance.

9. A game system according to any of claims 4 to 8, wherein a plurality of marks indicating a position through which said contrivance should pass are displayed as said second image to be dispersed in a plane defined by said retrieving direction and said orthogonal direction.

10. A game system according to any of claims 4 to 8, wherein a locus curve continuously connecting positions where said contrivance should pass through is displayed as said second image.

11. A game system according to any of claims 4 to 8, wherein said guide device scrolls said second image, thereby achieving relative movement in said retrieving direction.

12. A game system according to claim 11, wherein said guide device moves said first image, thereby achieving relative movement of said orthogonal direction.

13. A game system according to any of claims 4 to 8, wherein a speed in the relative movement of said first image and said second image with respect to said retrieving direction can be changed.

14. A game system according to claim 13, wherein said speed in the relative movement is changed according to a speed change operation for said input device.

15. A game system according to any of claims 4 to 8, wherein said evaluation device judges whether or not said first image passes on said second image, thereby evaluating said contrivance operation in consideration of the judgment result.

16. A game system according to any of claims 4 to 8, wherein said evaluation device judges whether or not a predetermined appeal operation is made for said input device in accordance with a timing at which said first image passes through the second image, thereby evaluating said contrivance operation in consideration of the judgment result.

17. A game system according to claim 4 to 8, wherein said evaluation device increases an appeal degree of said contrivance in accordance with the coincidence between the operation guided by said guide device and the contrivance operation caused by said player via said input device, and wherein said evaluation reflecting device changes an advantage or disadvantage of said player in said fishing game based on said appeal degree.

18. A game system according to claim 17, wherein said evaluation reflecting device generates an advantageous situation in said fishing game for said player when said appeal degree is equal to or more than a predetermined value.

19. A game system according to claim 17, wherein said evaluation reflecting device permits fish hooking as an advantageous situation in said fishing game when said appeal degree is equal to or more than a predetermined value, and wherein said evaluation reflecting device forbids fish hooking as a disadvantageous situation in said fishing game when said appeal degree is less than a predetermined value.

20. A game system comprising:

an image display device;

an input device for outputting a signal according to a player's operation; and a control device for advancing a fishing game utilizing a contrivance in a virtual fishing spot with reference to an output device, and for displaying an image according to the progress on the screen of said display device, wherein said control device comprises:

display setting device for displaying on a screen of said display device a first image corresponding to said contrivance and a second image indicating a position through which said contrivance should pass;

relative movement control device for relatively moving said first image in a predetermined retrieving direction relevant to said second image, and relatively moving said first image and said second image in a direction orthogonal to said retrieving direction according to a predetermined course change operation for said input device;

evaluation device for judging whether or not said first image passes on said second image, thereby evaluating said contrivance operation in consideration of the judgment result;

evaluation notifying device for notifying the evaluation caused by said evaluation device to a player; and evaluation reflecting device for changing the progress of said fishing game according to the evaluation caused by said evaluation device.

21. A game system according to claim 20, wherein said evaluation device judges whether or not a predetermined appeal operation is made for said input device in accordance with a timing with which said first image passes on said second image, thereby evaluating said contrivance operation in consideration of the judgment result.

22. A game system comprising:
an image display device;
an input device for outputting a signal according to a player's operation; and
a control device for advancing a game in accordance with predetermined procedures with reference to an output of said input device, and displaying an image according to the progress on a screen of said display device, wherein said control device comprises:
 display setting device for displaying on the screen of said display device a first image corresponding to a game element set as a player's operation target and a second image which functions as a reference for operating said game element;
 image control device for scrolling said second image in a predetermined first direction, and moving said first image in a second direction orthogonal to said first direction according to a predetermined operation for said input device;
 evaluation device for judging whether or not said first image passes on said second image, thereby evaluating a player's operation in consideration of the judgment result;
 evaluation notifying device for notifying the evaluation caused by said evaluation device to the player; and
 evaluation reflecting device for changing the progress of said game according to the evaluation caused by said evaluation device.

23. A game system according to claim 22, wherein said evaluation device judges whether or not a predetermined coordination operation is made for said input device in accordance with a timing with which said first image passes on said second image, thereby evaluating said operation in consideration of the judgment result.

24. An operation guiding system for guiding a preferable operation concerning a game element set as a player's operation target to the player through a display device of a game device, said operation control system comprising:
 display setting device for displaying on a screen of said display device a first image corresponding to said game element and a second image which functions as a reference for operating said game element; and
 relative movement control device for relatively moving said first image in a first direction relevant to said second image, and relatively moving said first image and said second image in a second direction orthogonal to said first direction according to a predetermined course change operation for an input device of said game device, wherein said display setting device displays a plurality of marks indicating a position through which said game element should pass as said second image to be dispersed in a plane defined by said first direction and said second direction.

25. An operation guiding system according to claim 24, wherein said relative movement control device scrolls said second image, thereby achieving relative movement of said first direction.

26. An operation guiding system according to claim 24, wherein said relative movement control device moves said first image, thereby achieving relative movement of said second direction.

27. A computer readable storage medium having recorded therein a program for advancing a fishing game utilizing a contrivance in a virtual fishing spot with reference to an output from an input device of a game device, and displaying an image according to the progress on a screen of a display device of the game device, wherein said program causes a computer provided in said game device to function as:
 guide device for guiding a contrivance operation to said player through a screen of said display device;
 evaluation device for evaluating the contrivance operation of said player by comparing the operation guided by said guide device with the contrivance operation caused by said player via said input device;
 evaluation notifying device for notifying the evaluation caused by said evaluation device to the player; and
 evaluation reflecting device for changing the progress of said fishing game according to the evaluation caused by said evaluation device, respectively.

28. A computer readable storage medium having recorded therein a program for advancing a fishing game utilizing a contrivance in a virtual fishing spot with reference to an output from an input device of a game device, and displaying an image according to the progress on a screen of a display device of the game device, wherein said program causes a computer provided in said game device to function as:
 display setting device for displaying on a screen of said display device a first image corresponding to said contrivance and a second image indicating a position through which said contrivance should pass;
 relative movement control device for relatively moving said first image in a predetermined retrieving direction relevant to said second image, and relatively moving said first image and said second image in a direction orthogonal to said retrieving direction according to a predetermined course change operation for said input device;
 evaluation device for judging whether or not said first image passes on said second image, thereby evaluating said contrivance operation in consideration of the judgment result;
 evaluation notifying device for notifying the evaluation caused by said evaluation device to the player; and
 evaluation reflecting device for changing the progress of said fishing game according to the evaluation caused by said evaluation device, respectively.

29. A computer readable storage medium having recorded therein a program for guiding a preferable operation concerning a game element set as the player's operation target to the player through a display device of a game device, wherein said program causes a computer provided in said game device to function as: display setting device for displaying on a screen of said display device a first image corresponding to said game element and a second image which functions as a reference for operating said game element;
 image control device for scrolling said second image in a predetermined first direction, and moving said first image in a second direction orthogonal to said first direction according to a predetermined operation for said input device;
 evaluation device for judging whether or not said first image passes on said second image, thereby evaluating a player's operation in consideration of the judgment result;
 evaluation notifying device for notifying the evaluation caused by said evaluation device to the player; and evaluation reflecting device for changing the progress of said game according to the evaluation caused by said evaluation device, respectively.

30. A computer readable storage medium having recorded therein a program for guiding a preferable operation concerning a game element set as the player's operation target to the player through a display device of a game device, wherein said program causes a computer provided in said game device to function as:

display setting device for displaying on a screen of said display device a first image corresponding to said game element and a second image which functions as a reference for operating said game element; and relative movement control device for relatively moving said first image in a first direction relevant to said second image, and relatively moving said first image and said second image in a second direction orthogonal to said first direction according to a predetermined change operation for the input device of said game device, respectively, said display setting device displaying a plurality of marks indicating a position at which said game element should pass as said second image to be dispersed in a plane defined by said first direction and said second direction.

\* \* \* \* \*